(12) United States Patent
Singh et al.

(10) Patent No.: US 10,593,105 B2
(45) Date of Patent: Mar. 17, 2020

(54) METHOD AND SYSTEM FOR LINKING A FIRST VIRTUAL REALITY (VR) IMMERSIVE SPACE WITH A SECOND VR IMMERSIVE SPACE

(71) Applicant: JANUS VR INC., Toronto (CA)

(72) Inventors: Karan Singh, Toronto (CA); James McCrae, Brampton (CA)

(73) Assignee: Karan Singh, Toronto (CA)

( * ) Notice: Subject to any disclaimer, the term of this patent is extended or adjusted under 35 U.S.C. 154(b) by 98 days.

(21) Appl. No.: 15/801,927

(22) Filed: Nov. 2, 2017

(65) Prior Publication Data
US 2019/0005717 A1 Jan. 3, 2019

Related U.S. Application Data

(60) Provisional application No. 62/420,146, filed on Nov. 10, 2016.

(51) Int. Cl.
*G06T 17/00* (2006.01)
*G06T 19/00* (2011.01)
(Continued)

(52) U.S. Cl.
CPC .............. *G06T 17/00* (2013.01); *G06F 3/011* (2013.01); *G06F 3/017* (2013.01); *G06F 16/955* (2019.01);
(Continued)

(58) Field of Classification Search
CPC ....... G06T 17/00; G06T 15/80; G06T 19/006; H04L 67/38; G06F 3/017; G06F 3/011;
(Continued)

(56) References Cited

U.S. PATENT DOCUMENTS

2017/0160815 A1\* 6/2017 Glazier ................... G06F 3/013
2017/0169610 A1\* 6/2017 King ..................... G02B 27/017
(Continued)

OTHER PUBLICATIONS

Oliveira et al., Synchronized World Embedding in Virtual Environments, Dec. 2004, IEEE Computer Society, 73-83 (Year: 2004).\*
(Continued)

*Primary Examiner* — Robert J Craddock
(74) *Attorney, Agent, or Firm* — Bhole IP Law; Anil Bhole; Marc Lampert

(57) ABSTRACT

A method and system for linking a first virtual reality (VR) immersive space with a second VR immersive space. The method includes: generating a portal in the first VR immersive space, the first VR immersive space having a first website displayed on a surface of the first VR immersive space; associating an internet link to the second VR immersive space with the portal, the internet link being part of the first website to link to a second website; rendering the second VR immersive space, the second VR immersive space having the second website displayed on a surface of the second VR immersive space; providing a preview of the second VR immersive space on a surface of the portal located in the first VR immersive space; and virtually placing a user in the second VR immersive space when the portal is selected by the user.

29 Claims, 8 Drawing Sheets

(51) Int. Cl.
  *G06F 17/22* (2006.01)
  *G06F 16/958* (2019.01)
  *G06F 16/955* (2019.01)
  *G06F 3/01* (2006.01)
  *G06T 15/80* (2011.01)
  *H04L 29/06* (2006.01)

(52) U.S. Cl.
  CPC ........ *G06F 16/972* (2019.01); *G06F 17/2247* (2013.01); *G06T 15/80* (2013.01); *G06T 19/006* (2013.01); *H04L 67/38* (2013.01)

(58) Field of Classification Search
  CPC .. G06F 16/955; G06F 16/972; G06F 17/2247; G06F 9/451; G06F 3/04815; H04N 7/157
  See application file for complete search history.

(56) References Cited

U.S. PATENT DOCUMENTS

2017/0228931 A1* 8/2017 Parker .................. G06T 19/006
2018/0061138 A1* 3/2018 Neeter .................. G06T 19/006

OTHER PUBLICATIONS

Steinicke et al., Transitional Environments Enhance Distance Perception in Immersive Virtual Reality Systems, Oct. 2, 2009, ACM, 19-26 (Year: 2009).*

* cited by examiner

METHOD AND SYSTEM FOR LINKING A FIRST VIRTUAL REALITY (VR) IMMERSIVE SPACE WITH A SECOND VR IMMERSIVE SPACE

TECHNICAL FIELD

The following relates generally to virtual, augmented or mixed reality, and more specifically to methods and systems for linking a first virtual reality (VR) immersive space with a second VR immersive space.

BACKGROUND

The World Wide Web ("WWW", or just "web") is a decentralized information space where documents, such as web pages, and other Web resources are identified by uniform resource locators ("URLs") and interlinked by hypertext links presented within Web pages and other documents. Web pages are documents that represent information and reference other documents and other web resources are identified by URLs, interlinked by hypertext links, and can be accessed via the Internet. Web pages are primarily text documents formatted and annotated with Hypertext Markup Language ("HTML"). In addition to formatted text, web pages may contain images, video, and software components that are rendered in a web browser as coherent pages of multimedia content. Embedded hyperlinks in web pages permit users to navigate to other web pages and resources. A web browser (hereinafter used interchangeably with "browser") is a software application for retrieving, rendering presenting, and traversing information resources, such as web pages, on the web. A web editor (hereinafter used interchangeably with "editor") similarly is a software application for the creation and editing of web content that is presented by a browser.

While web pages may contain a variety of multimedia content, they were originally designed to represent real-world documents; that is, two-dimensional sheets of paper containing text and image content. In keeping with the document analogy, all media content is generally laid out in boxes or as regions on a two-dimensional or "2D" page using a declarative language HTML (Hypertext Markup Language). An important aspect of HTML allows content on webpages to be linked to content on other web pages. The links when activated by users cause typical web browsers to present the linked web page in place of the current page or an additional document in new tab or window.

SUMMARY

In an aspect, there is provided a computer implemented method of linking a first virtual reality (VR) immersive space with a second VR immersive space, the method comprising: generating a portal in the first VR immersive space, the first VR immersive space having a first website displayed on a surface of the first VR immersive space; associating an internet link to the second VR immersive space with the portal, the internet link being part of the first website to link to a second website; rendering the second VR immersive space, the second VR immersive space having the second website displayed on a surface of the second VR immersive space; providing a preview of the second VR immersive space on a surface of the portal located in the first VR immersive space; and virtually placing a user in the second VR immersive space when the portal is selected by the user.

In a particular case, selection by the user comprises having the user virtually walk through the portal.

In another case, a GL Shading Language defines the appearance of the portal.

The method of claim 1, wherein generating the portal comprises defining position vectors and direction vectors for the portal in the first VR immersive space.

In yet another case, generating the portal comprises defining a linking position in the second VR immersive space for the portal, and wherein virtually placing the user in the second VR immersive space comprises virtually placing the user at the linking position.

In yet another case, the portal is generated only when the user selects the internet link in the first VR immersive space.

In yet another case, providing the preview of the second VR immersive space comprises displaying at least a portion of the second website on at least portion of the surface of the portal.

In another aspect, there is provided a system for linking a first virtual reality (VR) immersive space with a second VR immersive space, the system comprising: a database storing data associated with the first VR immersive space and the second VR immersive space; and a processing unit in communication with the database, the processing unit executable to perform: generating a portal in the first VR immersive space, the first VR immersive space having a first website displayed on a surface of the first VR immersive space; associating an internet link to the second VR immersive space with the portal, the internet link being part of the first website to link to a second website; rendering the second VR immersive space, the second VR immersive space having the second website displayed on a surface of the second VR immersive space; providing a preview of the second VR immersive space on a surface of the portal located in the first VR immersive space; and virtually placing a user in the second VR immersive space when the portal is selected by the user.

In a particular case, selection by the user comprises having the user virtually walk through the portal.

In another case, a GL Shading Language defines the appearance of the portal.

In yet another case, generating the portal comprises defining position vectors and direction vectors for the portal in the first VR immersive space.

In yet another case, generating the portal comprises defining a linking position in the second VR immersive space for the portal, and wherein virtually placing the user in the second VR immersive space comprises virtually placing the user at the linking position.

In yet another case, the portal is generated only when the user selects the internet link in the first VR immersive space.

In yet another case, providing the preview of the second VR immersive space comprises displaying at least a portion of the second website on at least portion of the surface of the portal.

In yet another case, the database is located on a webserver.

These and other aspects are contemplated and described herein. It will be appreciated that the foregoing summary sets out representative aspects of a method and system to assist skilled readers in understanding the following detailed description.

DESCRIPTION OF THE DRAWINGS

A greater understanding of the embodiments will be had with reference to the Figures, in which.

DETAILED DESCRIPTION

Figure 1:
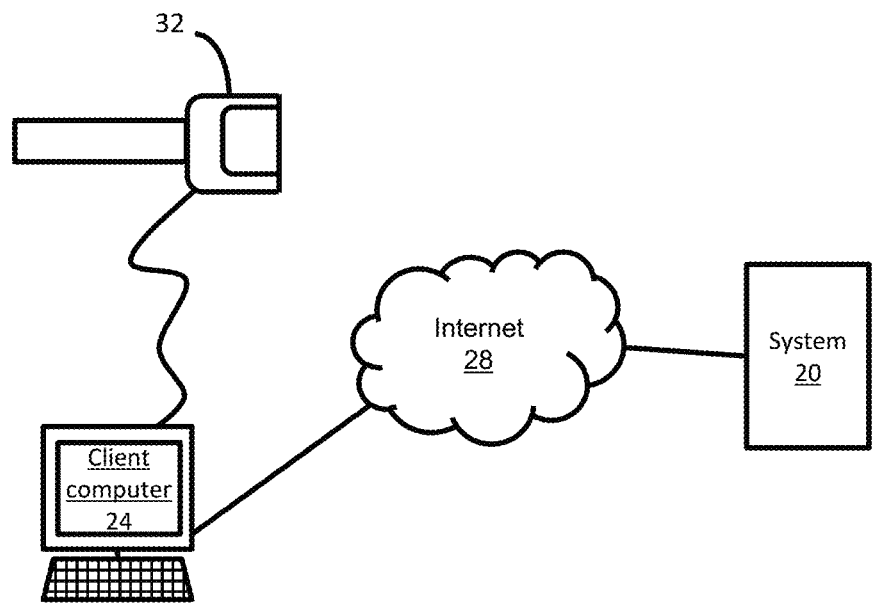
FIG. 1 is a block diagram illustrating a system for generating and navigating interactive linked virtual reality (VR) spaces.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

To provide a more flexible presentation space for emerging web content such as panoramic and stereo images and video, three dimensional ("3D") objects, audio, animations, medical imaging, geographical and other spatial data, the following embodiments can interpret web pages as immersive spaces. As described herein, a link analogously can be represented by a portal, wormhole, or rip in the ether that connects two web spaces. The following embodiments describe the design and implementation of an immersive browser that allows the flexible multi-dimensional presentation of multimedia web content. A preferred embodiment of this browser is suitable for use with Virtual Reality ("VR"), Augmented Reality ("AR") or mixed reality displays.

Conventional solutions for VR experiences is simply to render web pages as traditionally laid out two-dimensional ("2D") documents on a flat plane in front of the user's face on a VR or AR display. This is both unimaginative and an ineffective use of the spatial viewing capabilities of VR or AR technology. The present embodiments can provide a comprehensive solution for presenting web content in an immersive, social and collaborative VR or AR setting.

Additionally, conventional internet browsers, for example, have not changed fundamentally from their original design, around 20 year ago, whereby internet content was conceptualized as a document captured by the DOM (Document Object Model) from web pages authored using HTML and variants, with scripts for dynamic content. This type of design was pertinent for the time because internet content was mostly linked text and images. However, now as technology progresses, a technological problem arises in developing user experiences with richer 3D spatial content. For example, the internet of things makes even the physical location of web pages and programs meaningful spatially.

The present embodiments address the internet-related technological problem of developing spatial experiences by, for example, computationally interpreting webpages as spaces and links as portals. Conventional approaches to add spatiality to the internet are to essentially adapt Hypertext Markup Language ("HTML") and Document Object Model ("DOM") to represent a 3D world. However these approaches lack markup that are more developer friendly and efficient for 3D space-time content. In the present embodiments, space-time representation of web pages are provided such that spaces automatically better lend themselves to a spatial and social setting; i.e., browsing art in a virtual art museum.

Applicant recognized the substantial advantages of having web pages, both previously developed ("legacy") and developed in accordance with the present mark-up language, re-imagined as content presented as 3D space-time entities. In some cases, these entities can be advantageously linked together by portals, as described herein. For a legacy webpage, there is described herein a translator to re-interpret the document into a 3D experience.

In one aspect, a markup language that is a superset of HTML is provided, enabling the definition of web pages as immersive spaces that can be manipulated and reconfigured. The markup language comprises one or more asset definitions, spatial environment definitions and a layout instantiating the defined assets within the spatial environment, to altogether comprise the immersive space. Dynamic aspects of these spaces are controlled using a scripting language and events based on time and user interaction with the spaces. Immersive spaces may also be authored using pre-compiled modules and an API that provides functionality similar to that provided by the markup and scripting language. The physical location of the web pages may themselves have a meaningful location in the virtual world. An example of such a web page might be a webpage that illustrates the design and workings of smartphone. The web page itself can be physically hosted on a smartphone, allowing this web page to be presented in a virtual world with additional context of its physical location.

In another aspect, the markup and scripting can be used to define page "translators" that ascribe semantics to pre-existing web pages, so that can they be re-interpreted as immersive 3D spaces instead of 2D documents as originally intended.

Figure 8:
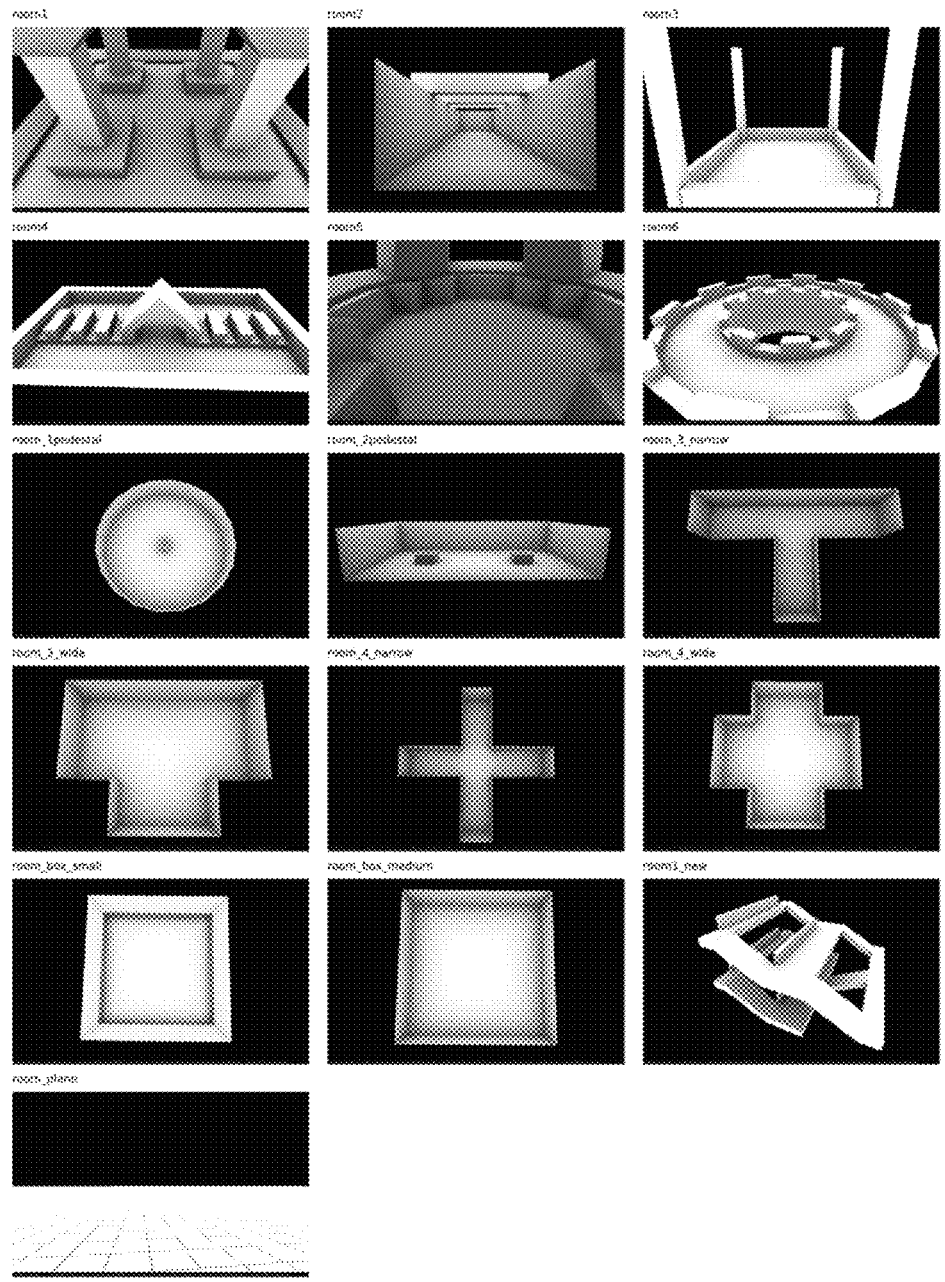
FIG. 8 illustrates top-down views of various exemplary space geometries.

In a representative example, as shown in FIG. 8, a virtual or immersive space is a 3D world housing virtual rooms within which internet content is made available and, more particularly, comprises a virtual environment that contains a 3D layout of a combination of links to other immersive spaces and assets or multidimensional media content such as 3D objects, lights, viewpoints, data for medical, scientific or information visualization, immersive sound and video, and even existing legacy 2D layouts of text and images. Most conventional approaches to accessing such web content in virtual reality (most typically accessed through a wearable VR Head Mounted Display ("HMD")) comprise first embedding all content within boxes or regions of a traditional document layout of a 2D web browser, and then visualizing the browser in the HMD and, perhaps, incorporating head movements and other gestures as an aide to navigation. However, such an approach can be considered as no more than bringing a traditional computer screen closer to the user's eyes via the wearable VR display.

In the present systems and methods, an application enables the user to be advantageously immersed in a virtual world, having a plurality of programmed virtual spaces, which is navigable in 3D, and is able to represent 3D content as well as legacy 2D content. The application can further enable the user to reconfigure spaces by dynamically and interactively manipulating the environment and assets in the environment.

The embodiments described herein provide methods and systems for generating and navigating interactive linked virtual reality spaces. FIG. 1 shows an overall architecture of various aspects of the present disclosure. A VR system 20 for providing an interactive virtual reality space in accordance with an embodiment and its operational setting is shown. VR system 20 stores a downloadable computer program product (referred to herein as an "application") that can be provided to client computers 24. VR system 20 further stores VR experience definitions (referred to herein as "definitions") that define the space-time interpretation of web pages, termed VR experiences (referred to herein as "experiences"). The application, once downloaded and executed by client computers 24, permits the generation and navigation of VR experiences, which comprises retrieving the definitions from VR system 20.

The definitions for an experience comprise a declaration of the environment of the VR experience, assets within the environment, space, avatar definitions, as well as links to other experiences. The linking between experiences enables user navigation in a VR world. In particular embodiments, navigation between experiences is carried out via virtual portals present in their environments and specified in the definitions.

The assets may comprise portals, media assets, and decorative assets. The media assets could be any of text, image, video, audio, 3D objects or other consumable information-based data. Decorative assets are similar in type to media assets, the difference being that role of the assets in the environments is more cosmetic than content intended to communicate some information.

In FIG. 1, a client computing device 24 is in communication with VR system 20 over the Internet 28. Client computing device 24 can be any type of computing device that is able to execute a VR application that causes client computing device 24 to connect to VR system 20 over a communications network to retrieve VR content, and then render the VR content to present a VR space on a display device. Examples of suitable computing devices include personal computers, laptop computers, tablet computers, smartphones with sufficient processing/graphical power, game consoles, etc. The viewing of the VR content may be through a traditional computer monitor, tablet display, smartphone display or linked or standalone visor 32 (also referred to as a head mounted display). The content may also be viewed in AR using transparent or translucent head mounted displays, lightfield projectors or other holographic displays. Users interact with the AR or VR content within the application via a variety of input devices including mouse, keyboard, microphone, gamepad, multiple degree of freedom game controller, and devices that track and recognize free-form hand, face and body gestures.

For the purposes of ease of understanding, and without limiting the scope of the functionality of the application, the application may comprise browsing and editing modes. The browsing mode may be understood as a VR browser. It will be understood that such an application may be equipped with a 3D rendering engine, which may for example be a third-party 3D rendering engine, for example OpenGL, WebGL, Unity™ or Unreal™, and the client computing device 24 can be configured to execute such a 3D rendering engine to provide a 3D rendered display to a user.

Figure 2:
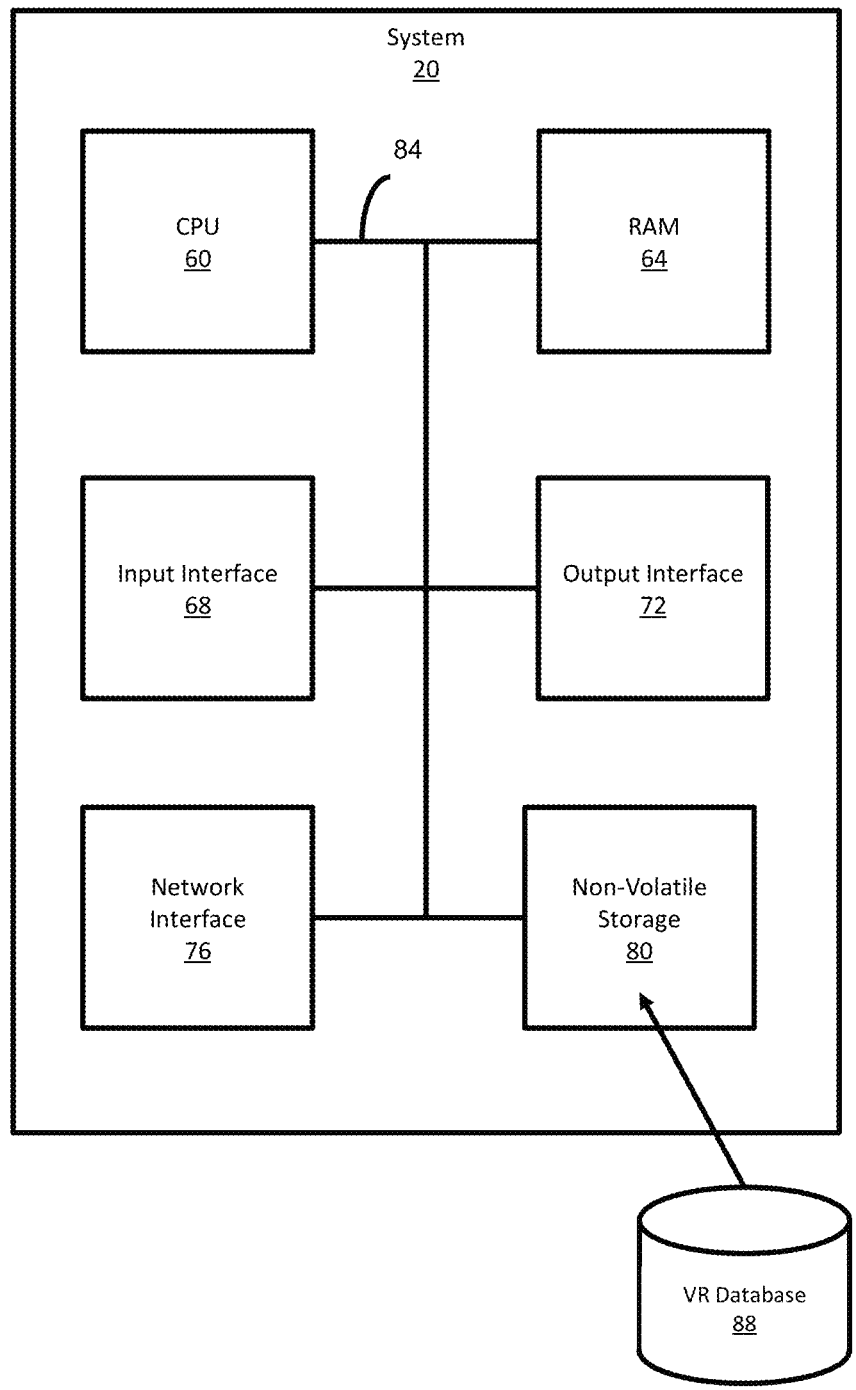
FIG. 2 is a block diagram illustrating various physical components of a VR system.

FIG. 2 shows various physical components of VR system 20 of FIG. 1. As will be appreciated, while VR system 20 is illustrated as being a single physical computing device, it can alternatively be two or more computing devices acting cooperatively to provide the functionality described.

As shown, VR system 20 has a number of physical and logical components, including a central processing unit ("CPU") 60, random access memory ("RAM") 64, an input interface 68, an output interface 72, a network interface 76, non-volatile storage 80, and a local bus 84 enabling CPU 60 to communicate with the other components. CPU 60 executes an operating system and other software. In some cases, the CPU 60 could include more than one CPU or other processing units such as a graphical processing unit ("GPU"). RAM 64 provides relatively responsive volatile storage to CPU 60. Input interface 68 enables an user to interact with the VR system 20 via a keyboard, a mouse, a microphone, a gamepad controller, a touchpad, visual trackers for in-air human gestures (for example a Kinect™), pressure and haptic sensors, or the like. Output interface 72 enables VR system 20 to output information in audio, visual haptic or other forms, such as via a speaker, a display, and a force generating device. Network interface 76 permits wired or wireless communication with other systems, such as client computing device 24. Non-volatile storage 80 stores computer readable instructions for implementing the operating system, and other components, as well one or more versions of the application for execution on client computing devices, a VR database 84, and any data used by other elements.

Figure 3:
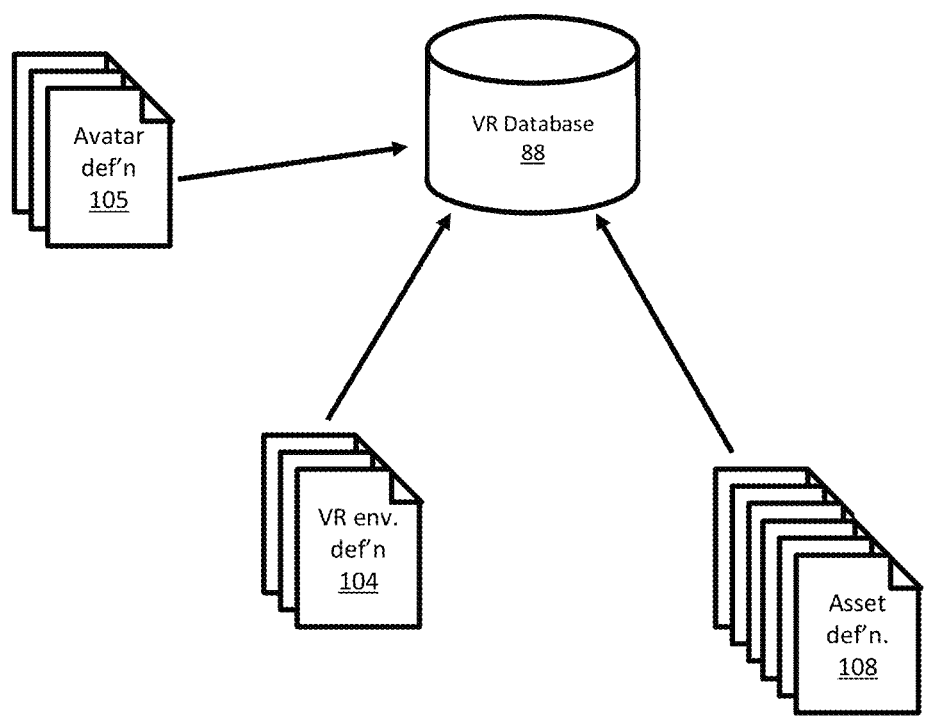
FIG. 3 is a block diagram illustrating various definitions contained in a VR database.
Figure 6:
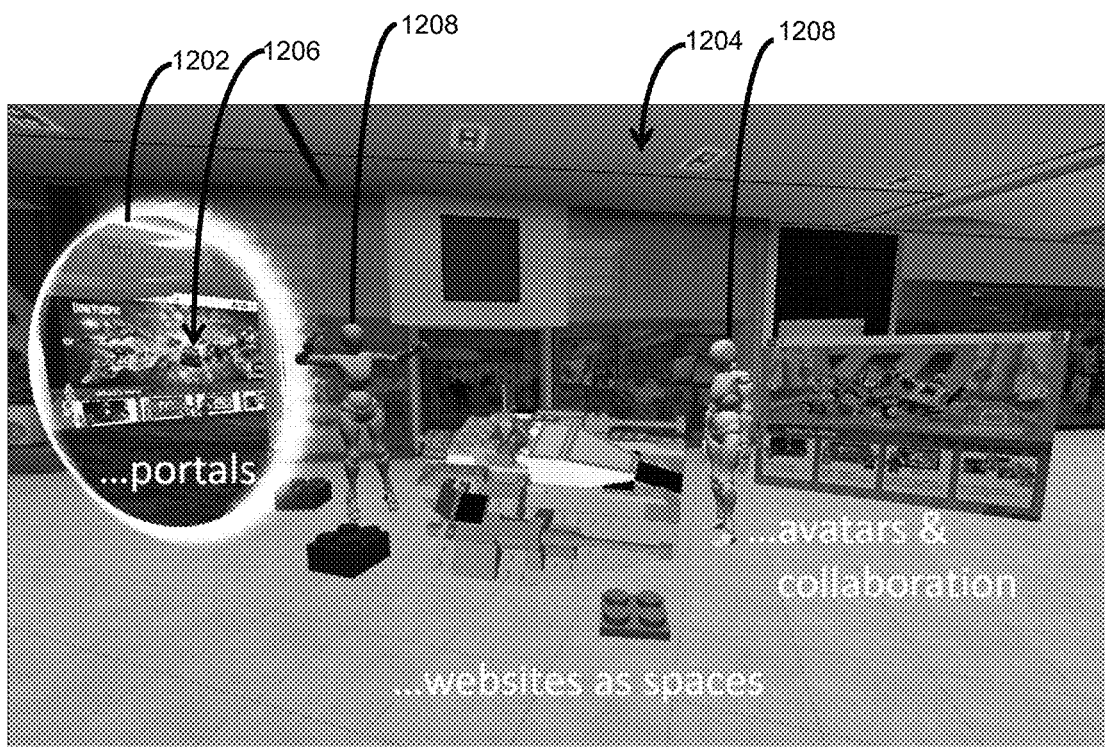
FIG. 6 is an exemplary web page rendered as a 3D space.

VR database 84 contains a number of definitions that are illustrated in FIG. 3 that can be combined in 3D space and time to create web pages presented as VR experiences as shown in FIG. 6. In particular, VR database 84 stores a set of VR environment definitions 104, a set of asset definitions 108, and avatar definitions 105. Each of the VR definitions 104 defines a VR environment, which includes a space-time framework, and an instantiation and layout of objects, lights, viewpoints, zones, semantic groups, links or portals to other VR spaces, images, text, audio, haptics, multimedia content, and other virtual entities that are to be used in the VR environment. The space-time framework defines the physical parameters and 3D constraints of the environment. Physical parameters such as a gravity, friction and atmosphere govern the virtual physics of objects and users navigating the immersive VR experience, and a temporal clock that relates the inception and passage of time in a VR experience, relative to other VR spaces. Physical constraints include bounds such as terrains, horizons, encompassing skies, and can include walls, floors, ceilings, pillars, steps and other geometry that typically define a static background or virtual set for the VR experience. Links between webpages can be represented as portals, wormholes or rips in the ether and are used to link and navigate between VR experiences. Portals have a number of attributes that define their shape, visual appearance and controls that determine the space-time entry and exit into and from linked VR experiences. Avatar definitions 105 define the parameters and characteristics of avatars represented in the 3D space.

Navigation via links between webpages, which can be represented in the VR space as rooms, is accomplished by accessing portals, wormholes, specialized doors, rips in the ether, or the like (collectively called "portals") (as further described herein with respect to the description of the mark-up language). The placement of portals within rooms permits navigation between rooms. Each portal is assigned a destination. As an example, a portal may be defined by a URL of the destination room. When a user steps into or selects the portal, the user may be virtually transported to the destination room. An exemplary portal 1202 is shown in FIG. 6 linking the exemplary space 1204 to another destination space 1206.

Figure 4:
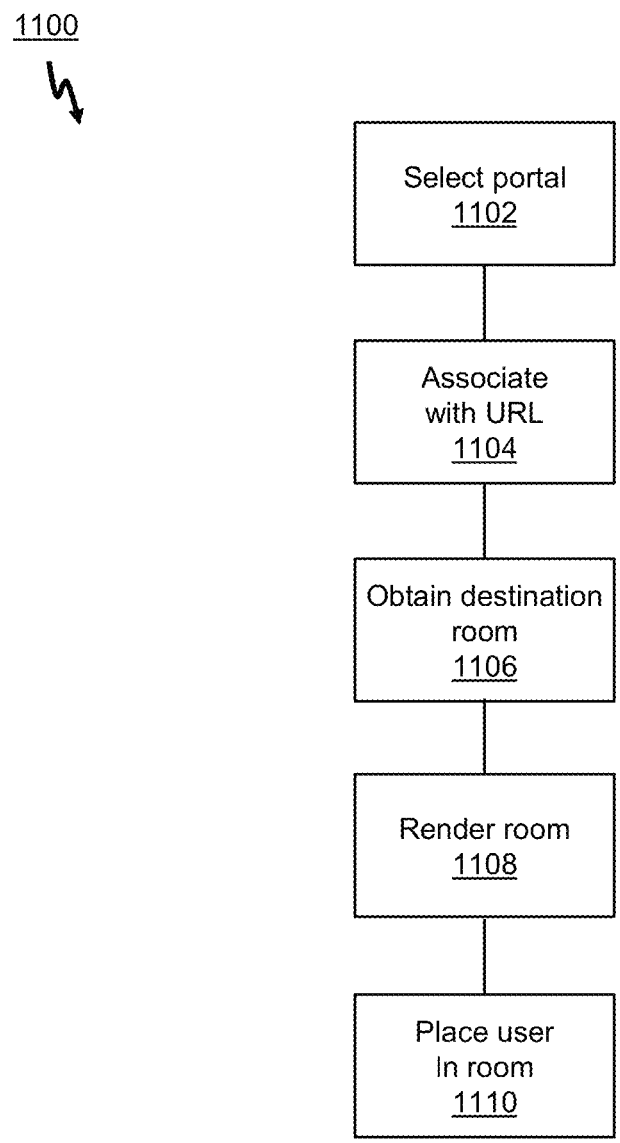
FIG. 4 is a flowchart illustrating a method for generating and navigating interactive linked virtual reality (VR) spaces.

This is accomplished by the method 1100 of FIG. 4. At block 1102, the user steps into or selects the portal. At block 1104, the application associates the user action with the URL and at block 1106 obtains the destination room definition from a source, for example a web server. The application renders the destination room at block 1108 and places the user at the destination room entrance with the orientation defined in the destination room definition at block 1110.

Asset definitions 108, typically relate to content stored in external files that are instantiated one or more times within a VR space. Assets can be 3D objects, shaders, particles, animations, images, video, audio, text, traditional 2D web pages, program scripts or other multimedia content types.

Avatars are 3D objects that are a representation of users in VR experiences. Loosely, like a cursor on a 2D page, an avatar typically marks the current location of a user in a VR space. In a preferred embodiment, an avatar is typically rendered as an articulated anthropomorphic character, with a range of gestures and movements to echo physical user interaction. In one embodiment a user may choose to be invisible or manifest virtually as multiple avatars. Avatars that are controlled programmatically and do not correspond to human users are referred to as Bots. Avatars whose behavior over space and time is recorded and played back in VR spaces are referred to as Ghosts. Avatars, Bots and Ghosts can further populate VR experiences and are the medium of interaction between users and programs on web pages. Two exemplary avatars 1208 are shown in the space 1204 of FIG. 6.

The distinction between 3D geometry or other multimedia that defines a VR environment, an asset, or an avatar is more a matter of intended purpose in a VR experience, rather than a property of the 3D geometry or multimedia content itself. For example a pillar in the form of a statue of a Greek God could be incorporated into a VR experience as any of the VR Environment, an Asset, or an Avatar.

VR experiences are configured to permit real-time manipulation programmatically, or through user interaction with the application. In the former, VR experiences can be manipulated by editing and saving markup language, asset or script files, or directly using a 2D text editor in the application itself. In the latter, one or more input devices such as a mouse, keyboard, game controller, or tracked user gestures, can be used within the application to directly select and manipulate in space and time, the VR environment, assets and avatars. For example, the 'w' key can be used to move forwards in the space, the 'a' key can be used to strafe left, the 's' key can be used to move backwards, the 'd' key can be used to strafe right, the 'space' key can be used to jump, and the like.

The VR experience markup language and scripting definitions described herein advantageously allow web pages (including existing HTML web pages) to be laid out as 3D spaces interconnected by portals.

Examples of applications of such VR experiences can include, for example, computer games, virtual expos and meeting rooms, virtual theaters and sporting arenas for streaming live immersive events, virtual buildings and spaces, built and staged to present various architectural and design options, virtual malls to provide a virtual extension to a typical e-commerce shopping site, or the like.

As described herein, an application to, for example, interactively view, annotate, inspect and edit the VR experiences, defined using the markup and scripting languages described herein, can be built as a stand-alone application, or as one that works within an existing browser (for example, Chrome™, Firefox™ or Safari™).

In a further aspect, a VR translator is provided to translate conventional webpages into an immersive 3D space (as further described herein with respect to the description of the mark-up language). For example, one version of a VR translation translates or converts traditional web pages into a space that has a web-surface (a surface that represents a functional 2D web page, that can be embedded in 3D by rendering it on a flat plane or texture mapped onto the surface of an arbitrary 3d object) on which the HTML document is displayed. In further embodiments, more complex translators can use a script to access various elements from the document object model of a conventional webpage, and map these elements to meaningful assets embedded in a 3D space. Finally a web page can be authored with our markup along with (or without) traditional HTML content, to provide a dual document-experience representation allowing content to be presented as optimally desired using a mix of 2D and 3D, that appears differently on a conventional browser and a space-time browser as described in this invention.

Figure 5:
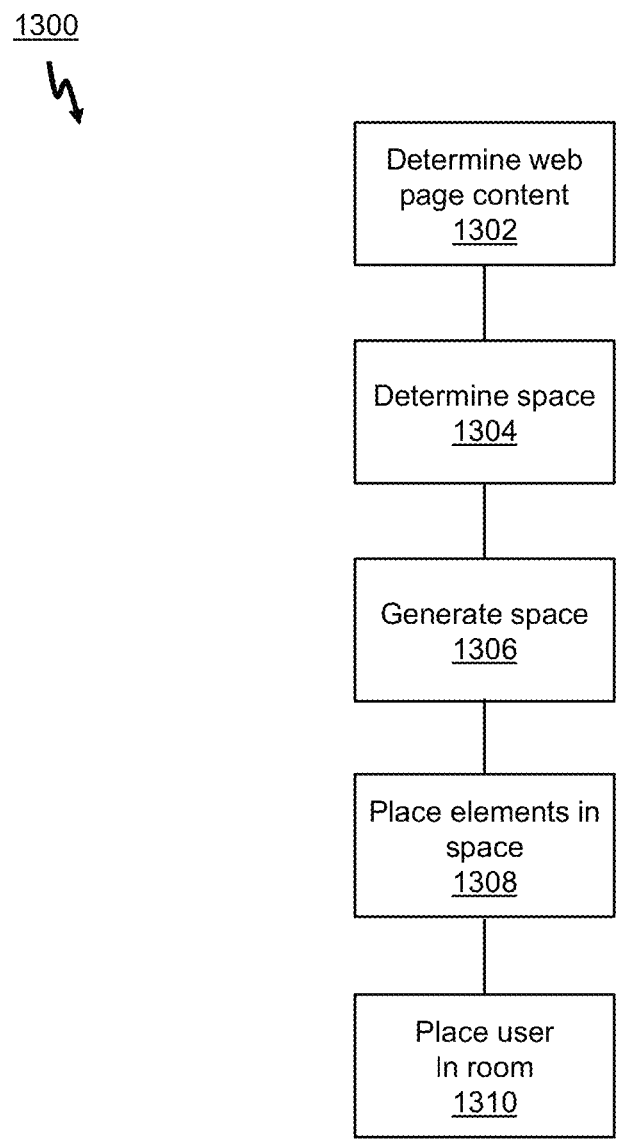
FIG. 5 is a flowchart illustrating an exemplary method 1300 of translating a conventional web page into an immersive 3D space.

As an example of a translation, a site translator can convert or reinterpret the content at a video hosting site (such as a "youtube.com") so it is dynamically presented as videos playing on the virtual screen of a 3D movie theater. FIG. 5 illustrates a flowchart of an exemplary method 1300 of translating a conventional web page into an immersive 3D space. At 1302, the content or elements of the conventional web page are analyzed or inspected for type, such as determining whether there are Document Object Model ("DOM") elements of interest worth translating and extracting those elements. Such elements may include, for example, embedded videos, audio, images or text. At 1304, the VR system 20 automatically determines the optimum 3D space to represent such elements. For example, determining that a conventional webpage with image and video content can be presented as a space (room) resembling an art gallery. At 1306, the VR system 20 then generates that determined space. At 1308, the VR system 20 automatically places the DOM elements in the space congruent with the space to make an immersive experience. In the above example, placing 2D elements of the conventional images and videos along walls of the room for hosting the image or video content. At 1310, the user's avatar is placed inside the generated space.

As described in the following exemplary embodiments, certain mark-up, scripting and shading language definitions may be used to implement the VR experience described herein.

The following is an exemplary VR experience definition which is particularly suitable for presenting web content in an immersive VR setting. However, a person of skill will recognize that the definition is not limited to the display of web content.

In this embodiment, the VR experiences 104 are coded using an eXtensible Markup Language ("XML") like structure that is an extension of HyperText Markup Language ("HTML"). The VR experience is comprised of environmental geometry, physical space-time parameters like gravity or friction, and other configuration parameters. The other parameters can include, for example, zones of interest in space and time, a predetermined maximum number of avatars allowed at any time in the space or within a zone, assets such as 3D objects, images, and other media content presented in the space, or links or portals to other spaces and avatars that populate the VR experience. Shading languages such as the GL Shading Language ("GLSL") can define the appearance of rendered content, and a scripting language such as a JavaScript ("JS") can define dynamic behavior of the VR space over time and in response to user input such as a mouse click.

In one aspect, the application may be configured to automatically generate a 3D rendered version of legacy 2D HTML web pages. The application may read the content of ordinary HTML web pages, and arrange the content in particular patterns on pre-defined geometry. However, in another aspect and as will now be further described, specified VR definition tags provided by the XML like specification can be added to an HTML web page source code or file to create user authored 3D VR experiences. Preferably, the specified VR definition tag is configured to be ignored by incompatible browsers, such as legacy 2D browsers, such that a single version of the web page source file is readable by 2D browsers and the application described herein.

Virtual environments are defined by embedding an HTML-like XML within an existing HTML file. A barebones HTML file has the following structure, with a head and a body:

```
<html>
<head>
</head>
<body>
</body>
</html>
```

In the present system, the head is important for two reasons. The first is because it is used as the title for the experience. The second purpose of the head tag is that it can optionally be placed with a "meta" tag to cause the application to display a particular alternate traditional web page at the request of the user.

```
<html>
<head>
<title>Example title</title>
<meta http-equiv="refresh" content="0; url=http://janusvr.com/index2.html" />
</head>
<body>
</body>
</html>
```

The XML importantly comprises a specified VR definition tag indicating that a virtual experience is being specified. In the present disclosure, the specified VR definition tag and resulting VR space are referred to as an "experience". Within the "experience" tag, aspects of the immersive space, can be specified, including the environment, space-time configuration parameters, and contents which instantiate the assets. It will be appreciated that the nomenclature "experience" is trivial and could be replaced by any other suitable term that is not already defined in the XML.

An experience is created within an existing HTML page by placing the experience tag within the body tag, as in the following example:

```
<html>
<head>
<title>Example title</title>
</head>
<body>
<experience> </experience>
</body>
</html>
```

Elements within an experience may appear as text within the page. To suppress this, the experience tags can be encapsulated using standard HTML comment tags. The application will still detect the VR experience, but other existing browsers will ignore this content. An example is:

```
<html>
<head>
<title>Example title</title>
</head>
<body>
<!--
<experience> </experience>
-->
```

```
</body>
</html>
```

The experience tag enables the inclusion of various assets. URLs may be specified which inform the application where different assets can be obtained. These assets may be stored on a web server or any other storage that is network accessible. Assets and content typically stored in other files such as 3D objects, images, video, and legacy web pages presented using a 2D document layout, can be pre-defined using asset tags, for instantiation and reuse in an experience, or directly incorporated within the experience.

Additionally, pre-defined assets can be used as a content palette within the application for building or editing an experience, by interactively creating and manipulating instances of these assets directly within the experience.

All assets may be defined within an assets tag as in the following:

```
<html>
<head>
<title>Example title</title>
</head>
<body>
<experience>
<assets>
</assets>
</experience>
</body>
</html>
```

All assets regardless of type may be associated with an identifier and a source URL. Examples of assets include images, audio, video, objects, shaders, ghost, web surface and script, each of which is described more fully below. Each such asset may have attributes that can be optionally set and may have default values for the attributes. The assets and their attributes described below are exemplary but not limiting.

For example, image assets may have the following attributes:
id—id of the asset
src—location of the image file
sbs3d (default "false")—when set to true, the image is treated as a SBS (side-by-side) formatted image. By default, the left eye will see the content on the left and the right eye the content on the right. Set the reverse3d attribute to true if you want to flip which side goes to each eye.
ou3d (default "false")—when set to true, the image is treated as an UO (under-over) format video. By default, the left eye will see the content on the top and the right eye the content on the bottom. Set the reverse3d attribute to true if you want to flip which side goes to each eye.
reverse3d (default "false")—flips which half of the image is shown to each eye, when either sbs3d or ou3d are set to true.
tex_clamp (default "false")—whether to perform texture clamping (GL_CLAMP_TO_EDGE), or allow textures to repeat (GL_REPEAT)
tex_linear (default "true")—if true, textures have bilinear filtering applied (GL_LINEAR). If false, a nearest sampling method (GL_NEAREST) is used which gives textures a pixellated look tex_compress (default "false")—if true, uses hardware-supported texture compression on the image texture (GL_COMPRESSED_RGBA).

An example use of a tag for an image asset is:
<assetImage id="woodplanks_img" src="woodPlanks.jpg"/> which creates a new image asset from woodPlanks.jpg for the space with id "woodplanks_img" (noting in all cases that the source URL could be an absolute or relative URL).

Sound assets may have, for example, the following attributes:
id—id of the asset
src—location of the sound file
Supported formats may be dependent upon the multimedia capabilities of the underlying platform (for example, DirectShow on Windows, or gstreamer on Linux)

An example use of a tag for a sound asset is:
<assetSound id="localmap_sound" src="localmap.mp3"/> which creates a new sound asset from localmap.mp3 for the room with id "localmap_sound".

Video assets may have, for example, the following attributes:
id—id of the asset
src—location of the video file
loop (default "false")—normally the video plays only one time, but when this attribute is set to true, the video will play indefinitely until the user leaves the environment
auto_play (default "false")—when set to true, video will play immediately when the environment is entered. If set to false (the default), the user must activate the video (or any object) to play it.
tex_compress (default "false")—if true, uses hardware-supported texture compression on the video texture (GL_COMPRESSED_RGBA).
sbs3d (default "false")—when set to true, video is treated as an SBS (side-by-side) format video. By default, the left eye will see the content on the left and the right eye the content on the right in each frame of video. Set reverse3d to true if you want to flip this.
ou3d (default "false")—when set to true, video is treated as an UO (under-over) format video. By default, the left eye will see the content on the top and the right eye the content on the bottom in each frame of video. One can set reverse3d to true if they want to flip this.
reverse3d (default "false")—flips which half of each frame is shown to each eye, when either sbs3d or ou3d are set to true.
Supported formats may be dependent upon the multimedia capabilities of the underlying platform (e.g. DirectShow on Windows, gstreamer on Linux).

An example use for a video asset is:
<assetVideo id="vid_id" src="movie_clip.mp4"/> which creates a new video asset from movie_clip.mp4 for the room with id "vid_id".

Object assets are 3D geometric objects which can be used within the room. Supported file formats may, for example, include OBJ, DAE, 3DS and FBX. Object assets may have, for example, the following attributes:
id—id of the asset
src—location of the file containing the geometry
tex0 (default " ")—location of one or more texture images (not using a material file)
mtl (default " ")—location of the material file (not using texture images)

tex_clamp (default "false")—whether to perform texture clamping (GL_CLAMP_TO_EDGE), or allow textures to repeat (GL_REPEAT)

tex_linear (default "true")—if true, textures have bilinear filtering applied (GL_LINEAR). If false, a nearest sampling method (GL_NEAREST) is used which gives textures a pixellated look tex_compress (default "false")—if true, uses hardware-supported texture compression on textures (GL_COMPRESSED_RGBA).

tex_mipmap (default "true")—if true, uses mipmapping for textures.

The URL to the file is specified by the src attribute. Materials for the file can also be specified using either a single texture file (specified with the texattribute), or by specifying the location of the material file (specified with the mtl attribute). An example of the first method (specifying a single image as a texture) is:

<assetObject id="pinetree" src="pinetree.obj" tex="pinetree.png"/> An example of the second method (specifying a material file which may reference many textures) is:

<assetObject id="pinetree" src="pinetree.obj" mtl="pinetree.mtl"/>

Note above that since both src, tex and mtl were specified as relative URLs, the files are expected to be located in the same directory as the HTML file itself.

The application may generate normals which are per-face, and assign them to each vertex, in the absence of an explicit specification of per-vertex normals in the file. If textures are to be used, texture coordinates should be contained in the source geometry file (these are for example "vt" lines in the OBJ file format). Finally, meshes with 4 or more vertices used to define a polygonal face are supported, however the application may divide these polygons into triangles as appropriate.

Animation assets are used to define functions of values over time, where the values can be mapped to any compatible attribute that can be animated in an experience, for example the translation in x of an object. These functions can be defined using a set of value, time data-samples, that can be both interpolated and extrapolated to compute a value at any given time.

Animation curves can be mapped to attributes in space using its id attribute. The time pairs for an animation curve can be defined using a samples attribute that is a list of value, time pairs (ordered in increasing time), for example as samples="5 1 9.3 4.1 −2 8", the values 5, 9.3 and −2 are specified at times 1, 4.1 and 8 units respectively. As experiences typically may have a large number of animation curves, animation assets can also be imported using a src attribute, from files exported from other sources and animation software in formats such as maya, fbx, and csv, that provide one or more animation curves that have an id name and a list of value, time pairs for each curve, for example as src="myanimcurves.csv".

The interpolation function of the samples typically uses a cubic spline interpolation that requires curve tangents to be defined at each data sample. A tangent attribute allows the tangents to be computed from the samples, for example as one of linear, smooth or flat, whereby in some cases the default being linear. Animation curves can also be extrapolated backwards and forwards in time beyond the defined data samples. Extrapolation attributes of pre and post define animation curve behavior before the first time sample and after the last time sample respectively. The default extrapolation behavior simply preserves the corresponding first value and last value before and after the extremal time samples respectively. Other useful extrapolation behavior can produce animation curves that periodically cycle or oscillate, in value with or without an offset beyond the extremal time samples. The pre and post attributes can thus be defined as cycle, oscillate, cycle_offset, oscillate_offset or none, whereby in some cases none being the default. An example of an animation asset can be: <assetAnim id="curve1" samples="5 1 9.3 4.1 −2 8" tangent="flat" pre="cycle_offset" post="oscillate"/>. In this example, curve1 defines a function that smoothly interpolates the data samples using flat tangents (in an ease-in ease-out fashion), and replicates the curve by periodically cycling the values before time 1 and replicates the curve by oscillating the values back and forth periodically post time 8. Another example of animation asset is: <assetAnim src="mycurves.csv" post="cycle"/>, which would read one or more animation curve id and samples from file mycurves.csv, and interpolate these curves using default linear tangents, with post extrapolation as cycles.

Shaders that govern the rendered appearance of objects can also be defined. In some cases, assetShader can be overloaded to also specify materials, such that it can be decoupled from an assetObject if desired. For example, by having a set_material attribute or making shaders attributes of a more general assetMaterial.

Shader assets permit use of either a GLSL fragment shader to shade geometry (set src), or a GLSL vertex shader to deform geometry (set vertex_src), or both. Attributes of the shader asset include, for example:

id—id of the asset src—(default " ") location of a GLSL fragment shader (plaintext file with GLSL code)

vertex_src—(default " ") location of a GLSL vertex shader (plaintext file with GLSL code)

An example for a fragment shader is:

<assetShader id="shader_id" src="shader1.txt"/>. Another example for both custom fragment and vertex shaders is:

<AssetShader id="shader_id" src="frag.txt" vertex_src="vert.txt"/>.

The application may apply default shader variables for the fragment shader, for example by using the following variables describing the 3D scene:

uniform mat4 iModelMatrix;

uniform mat4 iNormalMatrix; (note: this is transpose (inverse(iModelMatrix)))

uniform mat4 iViewMatrix;

uniform mat4 iViewMatrixInverse;

uniform int iLeftEye; (rendering left eye (0—no, 1—yes))

uniform float iGlobalTime; (number of seconds that passed since shader was compiled)

uniform int iUseTexture0; (use texture0 (0—no, 1—yes))

uniform int iUseTexture1; (use texture1 (0—no, 1—yes))

uniform int iUseTexture2; (use texture2 (0—no, 1—yes))

uniform int iUseTexture3; (use texture3 (0—no, 1—yes))

uniform sampler2D iTexture0; (samples from a texture defined on an object using the tex0 attribute)

uniform sampler2D iTexture1; (samples from a texture defined on an object using the tex1 attribute)

uniform sampler2D iTexture2; (samples from a texture defined on an object using the text attribute)

uniform sampler2D iTexture3; (samples from a texture defined on an object using the tex3 attribute)

uniform int iIllum; (defines an intended per-material illumination model to use)

uniform int iUseClipPlane; (use clip plane (0—no, 1—yes) (i.e. is the room viewed through a portal))
uniform vec4 iClipPlane; (equation of clip plane (xyz are normal, w is the offset, room is on side facing normal))
uniform vec3 iPlayerPosition; (the player's position in the room)
varying vec3 iPosition; (interpolated vertex position (note: not multiplied with modelview matrix))
varying vec3 iPositionWorld; ((iModelMatrix*gl_Vertex). xyz)
varying vec3 iPositionCamera; ((gl_ModelViewMatrix*gl_Vertex).xyz)
varying vec3 iNormal; (interpolated normal)
varying vec3 iNormalWorld; ((iNormalMatrix*vec4(gl_Normal, 0.0)).xyz)
varying vec3 iNormalCamera; (gl_NormalMatrix*gl_Normal)
gl_TexCoord[0].st (the UV texture coordinate on the geometry to be shaded An example shader which uses one of these GLSL variables to shade the surface based on normal direction is: void main(void) {vec3 normCol=(iNormal+vec3(1,1,1))*0.5; gl_FragColor=vec4(normCol, 1.0);}

The ghost asset captures a recording of a user. This recording contains position, orientation, head orientation, hand and body posture, and other parameters that define the parameters of a user avatar. The recording can also include the user's actions over time, for example, chat messages and speech. In general, all information related to the interaction of a user within a VR experience, with the VR environment, assets in it, and other users in the experience can be captured by a ghost recording. Recordings can be initiated and terminated by a predetermined command and may generate a recording file stored in the VR system 20. Ghost asset attributes include, for example:

id—id of the asset
src—location of the ghost recording file (a plaintext file)
An example for a ghost asset is:
<assetGhost id="ghost_id" src="ghost.txt"/>

A web-surface asset defines an interactive surface that provides a traditional 2D web page presentation. Note that this surface can be placed on an object by specifying a websurface_id that matches the assetWebSurface's id. Web surface asset attributes include, for example:

id—id of the asset (note that the corresponding Object should have its "websurface_id" attribute set to this value)
src—website to use for the assetWebsurface
width—texture width for rendering the assetWebSurface
height—texture height for rendering the assetWebSurface
An example web surface asset is:
<assetWebSurface id="google" src="https://www.google.com" width="1920" height="1080"/>.

A script asset defines a file containing JavaScript or similar web authoring language that can be run in the experience. Functions can be set up for specific events such as mouse clicks or on frame updates. Sounds can be played. Objects can be created, have their properties modified, and be destroyed. Script asset attributes may include, for example:

src—path to a file containing JavaScript for the room
Example usage (where the JS is contained in a file called "script.txt"):
<assetScript src="script.txt"/>

By defining any one or more of the foregoing assets on a web page, subsequent space definitions can incorporate instances of these assets.

Content for the experience may be defined within a space tag, which, in this embodiment, appears within the space open and close tags, and below the assets tag, as in the following example:

```
<html>
<head>
<title>Example title</title>
</head>
<body>
<experience>
<assets>
<assetImage id="woodplanks_img" src="WoodPlanks.jpg">
</AssetImage>
<assetSound id="localmap_sound" src="localmap.mp3" />
<assetObject id="pinetree" src="pinetree.obj" tex="pinetree.png" />
</assets>
<space>
</space>
</experience>
</body>
</html>
```

In various embodiments, a space may hierarchically contain one or more than one space definitions. Where a plurality of such spaces are defined, the spaces can incorporate assets from the collection of assets as defined above. Such an approach will not require the generation of multiple web pages, or having to re-download assets which are common between web pages.

The space may be assigned a plurality of attributes including, for example, a unique id, an enveloping sky, terrain, one or more entrance portals, lights, zones or regions of interest for both space and time, viewpoints, trails along which to navigate the space, a range of distances for teleportation, near and far plane distances that define local visibility, default sounds, physical attributes (for example, gravity, friction, jump velocity, walk and run speeds), temporal attributes, for example, an offset and clock tick to relate time across space hierarchies and linked spaces, cursor visibility, fog, global shader, multiplayer server, reset volume, permission attributes relating to the number of concurrent users or user ability to view or modify the space, or any other suitable attribute defining a virtual space. Without limiting the scope of such attributes, an example embodiment comprising the foregoing example attributes will now be described.

Temporal attributes of time_offset (in some cases, a default is zero time units) and time_scale (in some cases, a default of one) help define the passage of time in the space relative to its parent in a space hierarchy. Time, for the root of a spatial hierarchy is defined relative to a global clock, whose value is determined upon entry to the space within the application, such as when the user interactively types in the internet address or url for the space, or follows a portal or link from another space. Example use of temporal attributes is: <space time_offset="−5" time_scale="2"> . . . which would define time within the space to be 5 units in the past and with a clock that is twice as fast, relative to its parent space.

By default, a "sky" for the space may be randomly selected amongst a set which are packaged with the application. In some cases, one can define a custom skybox for the space. A "skybox" is a textured cube, used to represent anything in the environment appearing infinitely distant (akin to a very large cube which surrounds the player, which appears not to move when the player does). The textures (or images) for faces of this cube can be defined by image assets. As an example:

```
<assetImage id="sky_left" src="Sky0_c.jpg" />
<assetImage id="sky_right" src="Sky1_c.jpg" />
<assetImage id="sky_front" src="Sky2_c.jpg" />
<assetImage id="sky_back" src="Sky3_c.jpg" />
<assetImage id="sky_up" src="Sky4_c.jpg" />
<assetImage id="sky_down" src="Sky5_c.jpg" />
```

Figure 7:
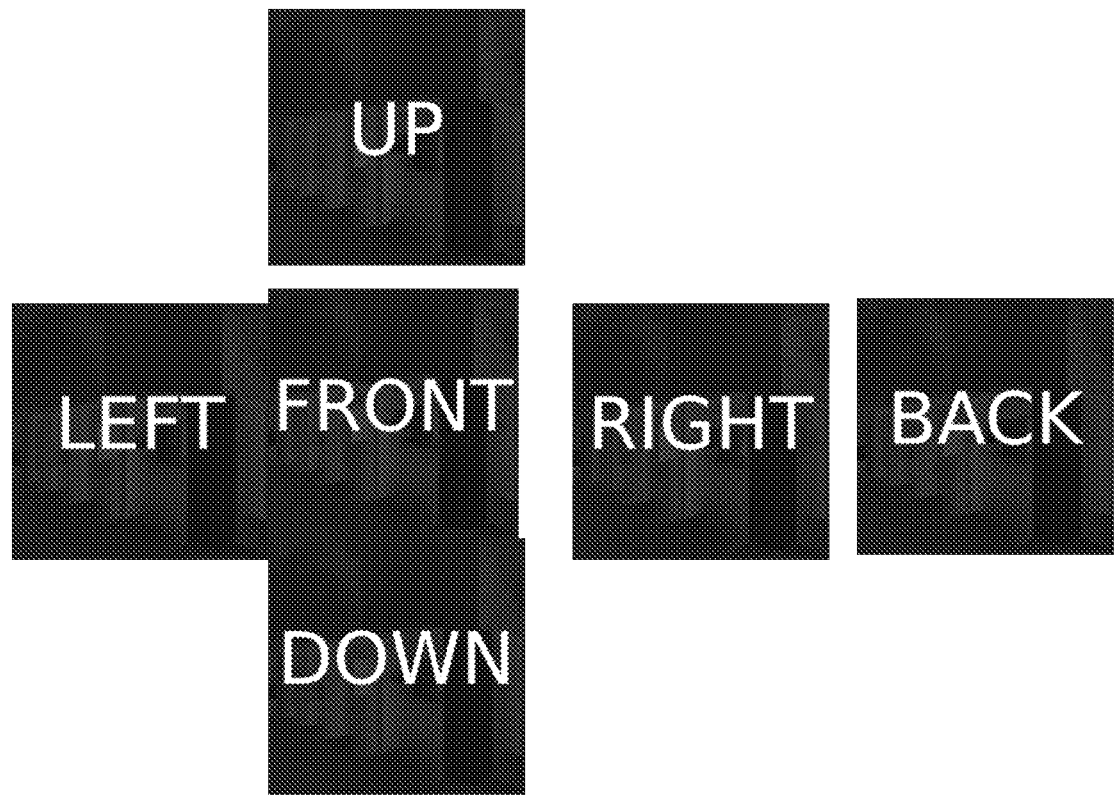
FIG. 7 is an exemplary orientation of images for defining a 3D space.

In some cases, it may be useful to define all 6 images, or for example, one may choose to leave out the "down" image. However, images should be oriented as shown in FIG. 7 so they line up correctly at the edges.

Image assets may be used to define the skybox for the room, for example with any or all of the following six attributes: skybox_up_id, skybox_down_id, skybox_left_id, skybox_right_id, skybox_front_id, skybox_back_id. As an example:

```
<space skybox_left_id="sky_left" skybox_right_id="sky_right"
skybox_front_id="sky_front" skybox_back_id="sky_back"
skybox_up_id="sky_up" skybox_down_id="sky_down">
</space>
```

Recalling that the image assets have already been defined, it is noted that each attribute can be set to the id of the corresponding asset, not the image filename. Also note that if none of the skybox attributes are set, then the room may be created with a random skybox packaged with the application as mentioned previously.

Defining geometry for the space can be accomplished in two ways. The application may be distributed with or have access to a plurality of space templates, or a user can define the geometry for the space using object assets. In case the space does not have a specified geometry, the application may be configured to automatically associate it with a template. FIG. 8 illustrates top-down views of various exemplary space geometries having the following exemplary ids: room_1pedestal, room_ramp, room_3_narrow, room_4_wide, room_box_small, room_plane. Generally, each space is characterized by a floor or terrain that may or may not be planar, and can have walls and a roof. For example, room_ramp is an example that dispenses with side walls but incorporates inclined floors and openings in the floors.

Space templates can be utilized by setting a use_local_asset attribute for the space to the template's name. For, example, for a template with id "room_box_small", the following command can be used: <space use_local_asset="room_box_small"> </space>. Note that if the use_local_asset attribute is not set, the space would be completely empty (and have no geometry or boundaries) or the application could be configured to select a default template.

The space may further comprise a color attribute. The color may be specified using 4 values which range between 0 and 1 for each of the red, green, blue and alpha (or transparency) components. For example, the color of a "very blue" opaque space or room could be expressed as "0 0 1 1". To set the space template color, the col attribute can be set, as in the following example: <space use_local_asset="room_box_small" col="0 0 1 1"> </space>

The space template may be made visible or invisible by setting the visible attribute, such as the following: <space use_local_asset="room_plane" visible="false"> </space>. This permits the geometry of the space to be used (e.g., for collision or to teleport) but not made visible.

Spaces can be entered through one or more portals. An entrance portal can be defined by position and direction in a 3D space, by specifying components for X, Y and Z. For example, the position where X=2, Y=3, and Z=4 can be expressed concisely as "2 3 4". Directions (vectors) can also be specified the same way, and they will be normalized within the application.

By default, the application may generate an entrance for the player into the environment at 3D position "0 0 0", and the player may be facing direction "0 0 1" (along the positive Z-axis). These values can be overridden by setting the pos (position) and fwd (forward direction) attributes for the space. As an example: <space use_local_asset="room_plane" col="0 0 1" pos="5 0 5" fwd="1 0 0"> </space>. In this example, when the player walks through a portal to reach the room, the entrance portal for the room will be at position "5 0 5", and the portal will be facing "1 0 0" (along the positive X-axis). A single point of entry can be defined as mentioned. Multiple entrances can be defined by defining entrance tags that will be described later.

Near and far planes can also be set for a space to define practical limits for interactive viewing of a space. The default near and far plane distances for a space may be 0.0025 and 500.0 (this corresponds to 2.5 mm and 500 m in terms of physical units). These default values can be overridden by setting the near_dist and far_dist attributes for a room, as in the following example: <space use_local_asset="room_plane" near_dist="0.01" far_dist="1000.0"> . . . </space> Note that setting the near plane distance to an excessively large value may cause visual artifacts when passing through a portal (the surface the portal is drawn upon becomes "too close"—clipped by the frustum's near plane). Choosing inappropriate near and far plane distances may result in excessive/frequent Z or depth conflict between geometry at similar depth from the viewer in a space.

Sounds may be defined for a space. In some cases, by default, spaces may be provided with an ambient "wind noise" in the background, and a voice may be activated during various actions. All of these default sounds may be muted when in the space by setting the default_sounds attribute of the space to false (the default is "true"). This is useful for example for a space or room representing a theater. As an example: <space use_local_asset="room_plane" default_sounds="false"> . . . </space>

Space physical attributes may also be defined, such as gravity, friction, jump velocity, walk and run speeds. Space by default may be defined with gravity which is the same as Earth (an acceleration on all objects of 9.8 metres per second squared, downward). Additionally, a jump_velocity defines the speed at which a user or avatar starts moving upward when jumping (and ultimately defines, in combination with gravity, how high the avatar can jump). The default jump_velocity may be 5.0 metres per second upward. These defaults can be changed, for instance to have moon-like gravity, or increase the maximum height when jumping. The walk_speed and run_speed attributes (defaults 1.8 and 5.4 metres per second) defines the speed of the user as they navigate the space. An example of how to change all of these attributes for the space is: <space gravity="−3.0" jump_velocity="10.0" walk_speed="5.0" run_speed="10.0" use_local_asset="room_plane" default_sounds="false"> . . . </space>

In addition to their avatar, which marks the location of a user in a space, users may have access to a 3D cursor in a space. The cursor is the visual manifestation in a space of user input that can be controlled by a mouse, game controller or other input devices to enable user actions such as pointing, selection, manipulation of content and navigation within VR spaces. The visibility of the cursor is controlled by a space attribute called cursor_visible which is set to "true" by default. One may wish to hide the 3D cursor for a space; to do so the cursor_visible attribute of the space is set to to "false", as in: <space use_local_asset="room_plane" cursor_visible="false"> . . . </space>.

Fog may be used to enhance the feeling of depth or scale within a space. There are numerous fog attributes possible, for example:
 fog—(default "false") when "true", use the fog effect
 fog_mode—(default "exp") defines the weight function to use, choices are: exp, exp2, linear
 fog_density—(default "1.0") coefficient which applies to the "exp" and "exp2" fog_mode
 fog_start—(default "0.0") coefficient which applies to the "linear" fog_mode (the distance at which "fog begins")
 fog_end—(default "1.0") coefficient which applies to the "linear" fog_mode (the distance at which "fog ends/is maximal")
 fog_col—(default "0 0 0") set the color of the fog
As an example:
 <space use_local_asset="room_home" fog="true" fog_mode="exp" fog_density="0.1" fog_col="0 0 0.2"> . . . </space>

Users may teleport within a space by performing a predefined action, such as holding the left mouse button and releasing where they would like to go. The maximum (and minimum distances) for the teleport functionality can be set for each space. These two attributes may be defined as, for example:
 teleport_min_dist—(default "5.0") The minimum cursor distance needed to allow teleporting, units in metres
 teleport_max_dist—(default "100.0") The maximum cursor distance needed to allow teleporting, units in metres
As an example:
 <space use_local_asset="room_home" teleport_min_dist="10.0" teleport_max_dist="1000.0"> . . . </space>

A global shared asset (which encapsulates both a vertex and fragment shader) can be applied globally to all of the contents in a space. To do this, one may declare an assetShader in the asset list, and then set the space's shader_id attribute to the id attribute of the assetShader. The global shader may be applied not only to objects in the space, but to user avatars, and portals (whether existing in the space or user-generated) in the space. The global shader may be overridden for objects and other contents of the space on a per-object basis by setting the shader_id attribute for each object. As an example: . . . <assetShader id="room_shader" vertex_src="room_vertex.txt" src="room_frag.txt"/> . . . <space shader_id="room_shader"> . . . .

A reset volume may be set, to define a volume where if the user enters it, they are brought back to the entrance of the space from where they last entered. This is most commonly used as an invisible safety net to reset a user who has "fallen" from the geometry of the space, due to the space's gravity and needs to be reset. It is defined by two 3D endpoints of a cuboid/axis-aligned bounding box. The default value effectively acts as an infinite volume below y=−100, so for spaces where the user is expected to go below this y value or where gravity points in a different direction, the reset volume should be redefined accordingly. In one embodiment the reset volume can also be used as an enveloping volume for the space that resets the user if they exit the volume. As an example, the reset volume can be defined as:
 reset_volume—(default "−FLT_MAX−FLT_MAX− FLT_ MAX FLT_MAX−100.0f FLT_MAX", where FLT_MAX is the largest representable floating point value) Set the endpoints of two opposite corners of the reset volume (an axis-aligned bounding box with format "x0 y0 z0 x1 y1 z1"). An example which uses corner points (−1000,−500,−1000) and (1000,0,1000): <space reset_ volume="−1000 −500 −1000 1000 0 1000"> . . . .

Spaces may also have a number of attributes that can control user access to the space. The maximum number of concurrent users in a space for example can be specified using max_users (in some cases, default is unrestricted), for example as: <space max_users="3"> . . . . A space can also have a minimum number of users that must be present for the space to unveil. For example, a space representing a theatrical or film experience, or tour bus may only commence once the space is filled to a minimum capacity. Minimum number of users can be indicated using a min_users (in some cases, default is zero) attribute, with usage for example <space min_users="3"> . . . .

Given the asset definition and spatial definition above, the designer of a space is now able to instantiate assets in the space.

Given that the assets and space-time parameters of space are now defined, it is possible to populate the space with content, including tags for instances of entrances, viewpoints, lights, zones or regions of interest, text, paragraph, portal, image, image3D, sound, video, object and ghost, some of which may rely on pre-defined assets.

All content is assigned a position, orientation and scale within the space. Additional physical space-time attributes such as velocity, acceleration, mass, moment of inertia can be defined, or computed for the assets using a physical simulation of the VR space. Assets in such a physical simulation can be tagged as active, passive, or none, depending on whether the asset actively alters it's physical state as a result of the simulation, passively affects the simulation without changing its own state, or does not interact with the simulation at all. Assets can also be attributed as physically rigid, deformable, fluid or gaseous. As an example of defining spatial and physical attributes, position can be set using x, y and z coordinates, an orientation defined by either x-y-z axis rotation angles, a forward direction vector (the fwd attribute), or a collection of 3 vectors which define a "coordinate frame"—these are directions for the content that specify horizontal (xdir), vertical (ydir) and forward (zdir, or depth) directions. The three xdir, ydir and zdir vectors should be orthogonal, normalized, and define a left-handed coordinate frame. When a fwd direction is defined, it defines zdir. xdir is then defined as the normalized cross product of the direction of zdir and gravity in the space, and ydir is subsequently the cross product of zdir and xdir. An example using either method is:
 <text pos="5 5 5" fwd="0 0 −1">example text</Text>
 <text pos="5 5 5" xdir="−1 0 0" ydir="0 1 0" zdir="0 0 −1">example text</Text>

Orientation can be controlled in different ways, any one of which can be used; for example, rotate="x y z" x,y,z angle rotations; fwd="x y z" the fwd or local zdir, xdir=fwd cross-product gravity, ydir=zdir cross-product xdir; or specifying xdir, ydir and zdir vectors.

The two above examples produce the same result as the default gravity direction is aligned with ydir in a space. The fwd attribute should thus not be co-linear with the gravity direction.

Tags which define space contents can be "nested" to define spatial hierarchies. This is achieved by using nested tags as in the following example:

```
<object id="clock_body" pos="0 18 0" col="1 1 0" scale="2 2 2">
    <object id="hour_hand" pos="5 0 0" scale=".5 .5 .5" col="1 0 0"
    rotate_axis="0 0 1" rotate_deg_per_sec="0.001667" />
    <object id="minute_hand" pos="5 0 0" col="0 1 0" scale=".7 .7 .7"
    rotate_axis="0 0 1" rotate_deg_per_sec="0.1" />
</object>
```

In the above example, objects which are nested within a parent tag inherit the spatial transform of the parent, and then apply their own transformations. Other unspecified attributes such as color also inherit their values hierarchically. This makes it possible, for instance, to have a room containing a clock object, and transform the entire clock body including the nested hands of the clock, while the hour and minute hands rotate relative to the clock body.

The text tag allows the addition of 3D text to a space. The following attributes can be set for text, for example:
  pos (default "0 0 0")—specify the position (anchor point is centered horizontally, and at the bottom vertically)
  fwd (default "0 0 1")—specify the orientation (or use xdir, ydir, zdir, defaults "1 0 0", "0 1 0", "0 0 1")
  col (default "# ffffff")—specify the text color (the attribute can be formatted as "R G B" where 0<=R,G,B<=1, # RRGGBB where RR,GG,BB are hexadecimal values between 0 and 255, and SVG color names e.g. "purple", "forestgreen")
  scale (default "1 1 1")—scale the object along each of its x (horizontal), y (vertical) and z (forward) axes
  locked (default "false")—if "true", prevents modification of attributes
  lighting (default "true")—if "true", uses the default shading which includes diffuse and specular components The text content itself is placed between the opening and closing text tags. An example which adds the text 'example text' colored light green to the space at position "5 5 5" and facing direction "0 0 1" may be defined thus: <text pos="5 5 5" fwd="0 0 1" col="0.5 0.8 0.5" scale="2 2 2" locked="false">example text</text> . . . .

The paragraph tag allows the addition of a generated image which contains text. The following attributes can be set for Paragraph, for example:
  pos (default "0 0 0")—specify the position (anchor point is centered horizontally, and at the bottom vertically)
  fwd (default "0 0 1")—specify the orientation (or use xdir, ydir, zdir, defaults "1 0 0", "0 1 0", "0 0 1")
  col (default "# ffffff")—specify the color (the attribute can be formatted as "R G B" where 0<=R,G,B<=1, # RRGGBB where RR,GG,BB are hexadecimal values between 0 and 255, and SVG color names e.g. "purple", "forestgreen")
  font_size (default "16")—specify the font size for the text
  text_col (default "# ffffff")—specify the text color (the attribute can be formatted as "R G B" where 0<=R,G,B<=1, # RRGGBB where RR,GG,BB are hexadecimal values between 0 and 255, and SVG color names e.g. "purple", "forestgreen")
  back_col (default "# ffffff")—specify the background color (the attribute can be formatted as "R G B" where 0<=R,G,B<=1, # RRGGBB where RR,GG,BB are hexadecimal values between 0 and 255, and SVG color names e.g. "purple", "forestgreen")
  back_alpha (default "1")—specify the opacity (non-transparency) of the background
  scale (default "1 1 1")—scale the object along each of its x (horizontal), y (vertical) and z (forward) axes
  locked (default "false")—if "true", prevents modification of attributes
  lighting (default "true")—if "true", uses the default shading which includes diffuse and specular components Like with the text tag, the paragraph's text content is placed between the opening and closing Paragraph tags. An example which adds a paragraph to the space at position "5 5 5" and facing direction "0 0 1": <paragraph pos="5 5 5" fwd="0 0 1" col="0.5 0.8 0.5" scale="2 2 2" locked="false">example paragraph's text</paragraph>

The entrance tag is used to define multiple entry points to a space. An entrance can have, for example, a position, orientation and scale in a space as well as an id so it can be linked to by a portal from another space. As an example: <entrance id="south_entry" pos="6 0 8" fwd="0 0 1"/>. An entrance is physically manifested as a surface embedded in a space and thus can have a surface_id attribute. Examples of commonly used surfaces are "plane", "cylinder, "sphere" or the id of any arbitrary surface defined as an assetObject. A user may navigate into a space from any point on the entrance surface in the direction specified by the surface normal at that point. Large entrances that envelop a space such as cylinders or spheres allow users a large number of options from where to enter the space. Rendering a large physical entrance however can be visually obtrusive once the user has entered a space. For this reason, an entrance frame can be defined to limit the displayed portion of an entrance to a limited region of the surface around the point of entry. The frame attribute can be set to only display the surface interior to a closed 2D curve in the parameter space of the surface. A simpler embodiment may be to define the radius of a framing sphere or other bounding volume around the point of entry, and only the portions of the entrance within this volume is displayed.

The portal tag creates a portal which can be used to connect the space to another space, or any other web page specified with a URL. Portals are conceived as hypothetical rips in the ether that can dynamically connect two spaces. In this aspect there is a conceptual difference between a linked space and a hierarchically nested space. The hierarchically nested space can be thought of as a snow globe or a world that is physically embedded within its parent space. A linked space on the other hand is not physically embedded within the space from which it is linked, rather it is the portal that has a physical embedding in the two spaces it links. The physical appearance of a portal in a space is a surface that users can pass through to go from one VR experience to another. The user exits their current space through a portal and enters a linked space at the corresponding parametric location of the linked entrance to the space. As with an entrance, a portal can be a surface of arbitrary shape, position, orientation, and scale, and can be framed similar to an entrance. Typically portal and entrances have the same surface shape and other attributes, though this is not essential, as long as a parametric mapping between the surface of the portal and the corresponding entrance exists. In addition to the attributes aforementioned for entrances, a portal can have the following attributes, for example:

url (default " ")—specify the URL to link to title (default " ")—a title for the page the URL links to (shown until it is loaded)

col (default "# ffffff)—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

draw_glow (default "true")—whether to show the portal glow along the boundary draw_text (default "true")—whether to show the text at the top of the portal for URL and page title auto_load (default "false")—if true, the room that the portal links to will be loaded immediately; if false, the portal must first be clicked before it will load the space.

thumb_id (default " ")—if set to the id of an assetImage, a "thumbnail image" will be displayed for the portal, useful for indicating what lies through it before it's loaded. The assetImage content is texture mapped to the shape of be square (width and height equal), and the portal will crop the image according to its dimensions to preserve the aspect ratio.

entry (default=" ")—if not set, the user enters the space at its default entrance, otherwise the id of the entrance in the linked space is used to define the point of entry.

An example portal is: <portal pos="66.7 −5 −9" url="inn.html" col="0.6 1 0.6" scale="1.8 3.2 1" title="Travel Inn" entry="entry1"/>.

As described herein, a portal can be either a two-dimensional or three-dimensional object, with at least one display surface having a preview (or thumbnail) of the linked VR immersive space on it.

In some cases, the shape of the two-dimensional or three-dimensional object comprising the portal can provide meaning. For example, the portal can be in the shape of a race car, which when selected, can transfer the user to a linked VR immersive space comprising a racing game.

In some cases, the display surface of the portal can have multiple hotspots associated with it. In this case, depending on where on the display surface the user selects, the user will be virtually transported to a different respective entry location in the linked VR immersive space. As an example, a portal can have a display surface with an oval shape, divided into four quadrants. Depending on which quadrant is selected, the user is virtually transported to four different continents as entry points in the linked VR immersive space. As another example, the portal can have the shape of a three-dimensional sphere representing a globe, with the display surface encompassing the exterior of the sphere. The display surface having many hotspots associated on it. Selecting a point on the globe, and a respective hotspot, can virtually transport the user to that respective geospatial point in the linked VR immersive space. In some cases, a display surface can extend into the interior of a three-dimensional object representing the portal. As an extension of the previous example, selecting a point deeper, towards the centre of the sphere, selects a hotspot that will virtually transport the user to a geospatial location represented on the surface of the sphere but further back in time; i.e., the closer towards the centre of the sphere, the farther back in time.

In some cases, the portal can be virtually selected by the user by mere clicking or touching of the portal. In further cases, the portal can be virtually selected by the user by a specific hand gesture; for example, knocking, parting a curtain, or the like.

In some cases, once the user virtually arrives in the linked VR immersive space, the originating VR immersive space remains visible in the portal, which is now located in the linked VR immersive space. Selecting this portal again will virtually transport the user back to the originating VR immersive space. In another case, once the user virtually arrives in the linked VR immersive space, the portal disappears. In another case, once the user virtually arrives in the linked VR immersive space, the portal disappears but the linked VR immersive space is overlaid to augment the originating VR immersive space. In this way, in some cases, the portal can be employed in augmented reality applications. In both the latter two cases, the portal disappears and thus the user would have to navigate back through a different portal to return to a particular space.

An Image tag represents in 3D a rectangular shape with a predefined thickness (e.g., 1/10 of the maximum width or height). The appearance can be considered much like art on canvas wrapped around a wooden frame. The dimensions are such that the aspect ratio of the image is preserved. Transparent images may be supported. An image can have the following attributes, for example:

id—set to the id of an assetImage pos (default "0 0 0")—specify the position (anchor point is centered horizontally and vertically)

fwd (default "0 0 1")—specify the orientation (or use xdir, ydir, zdir, defaults "1 0 0", "0 1 0", "0 0 1")

col (default "# ffffff)—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

scale (default "1 1 1")—scale the object along each of its x (horizontal), y (vertical) and z (forward) axes locked (default "false")—if "true", prevents modification of attributes lighting (default "true")—if "true", uses the default shading which includes diffuse and specular components An example Image is: <image id="caffeine_img" pos="−10 2 −5" fwd="1 0 0" scale="1.75 1.75 1"/>

An Image3D tag represents a 3D image that is geometrically the same as an Image, but its texture uses two different images, where each is shown to either the left or right eye to produce a 3D effect. On a traditional display, only the "left eye" image may be shown. A 3D image can have the following attributes, for example:

left_id—set to the id of the "left eye" AssetImage right_id—set to the id of the "right eye" AssetImage pos (default "0 0 0")—specify the position (anchor point is centered horizontally and vertically)

fwd (default "0 0 1")—specify the orientation (or use xdir, ydir, zdir, defaults "1 0 0", "0 1 0", "0 0 1")

col (default "# ffffff)—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

scale (default "1 1 1")—scale the object along each of its x (horizontal), y (vertical) and z (forward) axes locked (default "false")—if "true", prevents modification of attributes stereo_split (default "horiz_left_right")—takes one of four values: horiz_left_right (default), horiz_right_left, vert_top_bottom, vert_bottom_top. With this naming convention, the first image region specified is for the left eye, and the second for the right eye, e.g. "vert_bottom_top" would be bottom half of the image for the left eye, top half of the image for the right eye.

lighting (default "true")—if "true", uses the default shading which includes diffuse and specular components An example image3D is:

<image3D left_id="horse_left_img" right_id="horse_right_img" pos="−10 2 −5" fwd="1 0 0" scale="1.75 1.75 1"/>

Image3D also supports side-by-side ("SBS") or top-bottom formatted images, where the images for both eyes are contained in a single file. This can be used by setting the left_id and right_id to the same assetImage id. By default, the image will be assumed to be split horizontally left and right for left and right eyes. This default behavior can be changed by specifying the stereo_split attribute, which takes one of four values: horiz_left_right (default), horiz_right_left, vert_top_bottom, vert_bottom_top. Examples include:

```
<assetImage id="img_lr" src="lr.jpg" />
<assetImage id="img_tb" src="tb.jpg" />
...
<image3D pos="−5 1 −5" left_id="img_lr" right_id="img_lr" />
<limage3D pos="5 1 −5" left_id="img_tb" right_id="img_tb" stereo_split="vert_top_bottom" />
```

A sound tag can play a specific sounds asset, for example, when the player enters a rectangle defined on the XZ plane, which is used to "trigger" the sound. One can also specify whether the sound should loop once triggered, or only play back once. To get ambient sound or music to play for the room upon entry, use a very large rectangle to trigger the sound (or at least contains the room's entrance portal), and set the sound to loop. A sound can have the following attributes, for example:

id—set to the id of an assetSound rect (default "0 0 0 0")—presently, defines two opposite 2D corners of a rectangle which triggers the sound to play, the format is "X1 Z1 X2 Z2"

loop (default "false")—normally the sound plays only one time, but when this attribute is set to true, the sound will play indefinitely until the player leaves the room play_once (default "false")—when set to true, the given Sound will only play one time for the duration of the visit. If set to "false" (the default), the sound will play once each time the player enters the room.

pos (default "0 0 0")—when set to any other value than the default, the Sound is 3D spatialized (requires version 45+)

dist (default "1.0")—distance attenuation setting for 3D spatialized sound (requires version 45+)

gain (default "1.0")—gain setting for 3D spatialized sound (requires version 45+)

pitch (default "1.0")—pitch setting for 3D spatialized sound (requires version 45+)

An example aound, which plays "music_sound" on loop when the player's X position is between −100 and 100, and Z position is between −50 and 50 is: <aound id="music_sound" rect="−100 −50 100 50" loop="true"/>.

A video tag plays a specific video asset. The video can be controlled by, for example, left clicking on it (stop and play). One may specify whether the video should loop once playing, and whether the video should start playing automatically when the room is entered. Multiple videos can be associated with one video asset without any extra performance penalty (useful if you want the same video to appear at multiple locations in the room). The video will appear in the room as, for example, a rectangle, and the ratio of the height and width dimensions will match that of the video itself, preserving aspect ratio. In some cases, all videos in a room are stopped automatically when the user leaves the room. A video can have the following attributes, for example:

id—set to the id of an assetVideo thumb_id (default " ")—set to the id of an assetImage, to show an image/thumbnail for this video while it is not playing (the assetImage can even animate)

pos (default "0 0 0")—specify the position (anchor point is centered horizontally and vertically)

fwd (default "0 0 1")—specify the orientation (or use xdir, ydir, zdir, defaults "1 0 0", "0 1 0", "0 0 1")

col (default "# ffffff")—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

scale (default "1 1 1")—scale the video along each of its x (horizontal), y (vertical) and z (forward) axes locked (default "false")—if "true", prevents modification of attributes lighting (default "true")—if "true", uses the default shading which includes diffuse and specular components As an example, a video which plays "vid_id" within a rectangle positioned at "0 2 −5" and facing "0 0 1":<video id="vid_id" pos="0 2 −5" fwd="0 0 1"/>

An object tag refers to an instance of 3D geometry placed in the room. Objects can be used to define both the geometry of the room, as well as the boundary for the room, by using the collision_id attribute, detailed below. An object can have the following attributes, for example:

id—set to the id of an assetObject pos (default "0 0 0")—specify the position (anchor point is centered horizontally, and at the bottom vertically)

fwd (default "0 0 1")—specify the orientation (or use xdir, ydir, zdir, defaults "1 0 0", "0 1 0", "0 0 1")

col (default "# ffffff")—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

scale (default "1 1 1")—scale the object along each of its x (horizontal), y (vertical) and z (forward) axes locked (default "false")—if "true", prevents modification of attributes cull_face (default "back")—options are "back", "front", "none" which specify what polygons are culled when the Object is rendered collision_id (default " ")—when set to the id of an assetObject, collision testing is performed with that assetObject. This makes it possible to define the boundary for the room using one's own custom geometry. (Note that the id and collision_id attributes can be set differently—the collision_id may refer to an assetObject which is a low-polygon count version of a more detailed model, such as a bounding cube or sphere. Note also that collision tests are not performed if the player is not within the bounding volume of the assetObject.)

matter (default="rigid), describes the object as rigid, deformable, liquid or gas.

physics (default="active"), describes the physical behavior of the object as active, passive or none.

rotate_axis (default "0 1 0")—defines an axis of rotation rotate_deg_per_sec (default "0")—specifies the number of degrees to rotate per second about the axis defined by rotate_axis (note use of this feature is discouraged, as presently it breaks other interactions with FireBox—use at your own risk)

video_id (default " ")—set to the id of an assetVideo to shade the object using frames of the video as a texture (see the section on assetVideos for more information on defining an assetVideo). Also note that the object if clicked will serve as a control to start/stop the asset-Video.

image_id (default " ")—set to the id of an assetImage to shade the object using the image as a texture (see the section on assetImages for more information). Note that the assetImage will work even if SBS/UO formatted, or has animation.

shader_id (default " ")—set to the id of an assetShader to shade the object with a GLSL fragment shader (see the section on assetShaders for more information on defining an assetShader)

websurface_id (default " ")—set to the id of an assetWebSurface to texture the object with a 2D web view (see the section on assetWebSurfaces for more information on defining an assetWebSurface)

thumb_id (default " ")—set to the id of an assetImage, to show an image/thumbnail when an attached websurface is not selected (the assetImage can animate)

lighting (default "true")—if "true", uses the default shading which includes diffuse and specular components anim_id (default " ")—set to the id of an assetObject containing an animation anim_speed (default "1.0")—changes the rate of playback of the animation defined by anim_id loop (default "false")—if set to true, an animation will repeat from the start once completed visible (default "true")—if set to false, the geometry for the object is not visible/rendered Here is an example object, which is an instance of an assetObject with id "room_adventure", which is also used as a collision model. It is locked, at position "0 0 0", faces direction "0 0 1", and will be colored dark green: <object id="room_adventure" collision_id="room_adventure" locked="true" pos="0 0 0" xdir="1 0 0" ydir="0 1 0" zdir="0 0 1" scale="1 1 1" col="0.2 0.3 0.2 1.0"/>

A ghost tag refers to an instance of a recorded avatar within the room. Properties for the ghost invariant to the recording, such as scale, color, and custom geometry used to represent the ghost can all be specified. When no geometry is specified for the "head" and "body" parts of the ghost, a default boxy appearance is used. Since a ghost is a recording, there are options to set the recording to loop and to auto_play on room entry. A ghost can have the following attributes, for example:

id—set to the id of an assetGhost cull_face (default "back")—options are "back", "front", "none" which specify what polygons are culled when the Object is rendered (may be useful when using custom geometry for ghost's body and head)

col (default "# ffffff)—specify the color (the attribute can be formatted as "R G B A" where 0<=R,G,B<=1, # RRGGBBAA where RR,GG,BB and AA are hexadecimal values between 0 and 255 representing red, green, blue and alpha or transparency components, or as SVG color names e.g. "purple", "forestgreen")

scale (default "1 1 1")—scale the ghost along each of its x (horizontal), y (vertical) and z (forward) axes locked (default "false")—if "true", prevents modification of attributes head_id (default " ")—the id of an assetObject which will be used to define the geometry for the head of the ghost head_pos (default "0 1 0")—specify the relative position of the head in the model (the point of articulation for the head relative to the body, where the centre point between the feet should be at "0 0 0")

eye_pos (default "0 1.6 0")—specify relative to the avatar model, where the central eye position should be eye_ipd (default "0")—specify the virtual IPD (the spacing between the eyes of the virtual character, units are in metres)

body_id (default " ")—the id of an assetObject which will be used to define the geometry for the body of the ghost shader_id (default " ")—set to the id of an assetShader to shade the ghost with a GLSL fragment shader (see the section on assetShaders for more information on defining an assetShader)

loop (default "false")—normally the ghost recording plays only one time, but when this attribute is set to true, the ghost recording will play indefinitely until the player leaves the room auto_play (default "false")—when set to true, the ghost recording will start playing immediately when the user enters the room. When false, the user clicks the ghost to play the recording.

lighting (default "true")—if "true", uses the default shading which includes diffuse and specular components userid_pos (default "0 0 0")—an offset to relocate the userid of the ghost (useful if the geometry of the avatar blocks it)

An example is: <ghost id="ghost1" auto_play="true"/>. A more complete example, where assetObjects are used to define the geometry for the head and body of the ghost is:

```
<assetObject id="rikku_head" src="rikku_ghost/rikku_head.obj"
mtl="rikku_ghost/rikku_head.mtl" />
<assetObject id="rikku_body" src="rikku_ghost/rikku_body.obj"
mtl="rikku_ghost/rikku_body.mtl" />
<assetShader id="rikku_shader" src="rikku_ghost/rikku_shader.txt" />
<assetGhost id="ghost1" src="ghost1.txt" />
...
<ghost id="ghost1" shader_id="rikku_shader" head_id="rikku_head"
head_pos="0 1 0" body_id="rikku_body" scale="1.5 1.5 1.5"
cull_face="none" loop="true" auto_play="true" />
```

A particle tag creates a particle system, where each particle is, for example, often a quad rotated to face the user, but each particle can be any kind of geometry defined by specifying an object asset. The image_id attribute is set to set the texture for the quad. An id attribute which matches an object asset is set to specify geometry other than a quad to use for each particle. For each particle, its initial position, velocity, acceleration, color and scale can be specified, as well as an additional random attribute which will be added, discussed below. A particle can have the following attributes, for example:

image_id (default " ")—set to the id of an assetImage to use as the texture for each particle id (default " ")—set to the id of an assetObject to use custom geometry instead of a textured quad (Note: specifying an assetObject to use for each particle is optional, a textured quad is generally used)

rate (default "1")—how many particles to generate per second count (default "0")—the total number of particles allowed by this system at any time duration (default "1.0")—the lifetime in seconds of a particle fade_in (default "1.0")—the number of seconds as particle is created that the alpha value should linearly fade from 0 to 1 fade_out (default "1.0")—the number of seconds prior to particle removal that the alpha value should linearly fade from 1 to 0 pos (default "0 0 0")—initial position for generated particles vel (default "0 0 0")—initial velocity for generated particles accel (default "0 0 0")—initial acceleration for generated particles col (default "1 1 1, 1")—initial color for generated particles scale (default "1 1 1")—initial scale for generated particles rand_pos (default "0 0 0")—an initial random position that is added to the pos value, where the contribution is random (that is, for each component x,y,z, a random factor between 0 and 1 is generated and multiplied before adding rand_pos to pos)

rand_vel (default "0 0 0")—an initial random position that is added to the vel value, where the contribution is random (that is, for each component x,y,z, a random factor between 0 and 1 is generated and multiplied before adding rand_vel to vel)

rand_accel (default "0 0 0")—an initial random position that is added to the accel value, where the contribution is random (that is, for each component x,y,z, a random factor between 0 and 1 is generated and multiplied before adding rand_accel to accel)

rand_col (default "0 0 0")—an initial random position that is added to the col value, where the contribution is random (that is, for each component x,y,z, a random factor between 0 and 1 is generated and multiplied before adding rand_col to col)

rand_scale (default "0 0 0")—an initial random position that is added to the scale value, where the contribution is random (that is, for each component x,y,z, a random factor between 0 and 1 is generated and multiplied before adding rand_scale to scale)

lighting (default "true")—if "true", uses the default shading which includes diffuse and specular components loop (default "false")—if set to "false", only count particles will be generated and no more, but if set to "true", particles will continue to be generated forever.

An example which creates a "waterfall" effect is:

```
<assetImage id="water_particle" src="water.png" />
...
<particle pos="-0.85 4 -0.25" scale="0.1 0.1 0.1" vel="-1 0 0"
accel="0 -9.8 0" rate="100" count="200" lighting="false" image_id=
"water_particle" duration="1.5" loop="true" rand_pos="0 0.1 0.5"
rand_vel="-0.5 0 0" rand_accel="0 0.5 0" col="0.5 0.5 0.5"
rand_col="0 0 0.3" blend_src="src_alpha" blend_dest="one" />
```

In the above example, particles are generated with an initial position (pos+rand_pos) where x=−0.85, y=[4,4.1], z=[−0.25,0.25]. The initial velocity of particles (vel+rand_vel) will be along the −x direction, with a speed between 1 and 1.5 meters/sec. Initial acceleration (accel+rand_accel) will be downward along the y axis, with a rate between 9.3 and 9.8 meters per second squared. 100 particles will be generated per second, up to a maximum of 200. Particles will last 1.5 seconds before disappearing, and will continue to be generated indefinitely (loop is set to true). The color of particles (col+rand_col) will be bluish and white, since the red and green components are constant at 0.5, but the blue component randomly varies between 0.5 and 0.8.

Vistas or viewpoints are defined using attributes like position, orientation and view parameters that describe the parameters necessary to provide a user with a pre-defined vista of the VR experience. As an example <vista id="view1" pos="5 1.6 3.2" fwd="0 0 1"/> . . . . Vistas can be linked by trails that specify a desired user navigation path along which a user can move between two vistas. Trails are thus curves (defined using a path attribute) in both space and time that inform both the path and the pace a user takes, wandering through a VR experience. A lag attribute provides information about how closely the trail path should be followed in both space and time. In one embodiment users will naturally follow a given trail without any further guidance from the application. The application can however prompt the user visually to towards the trail if the users exceeds the lag. Alternately, users the application can automatically teleport users that exceed the allowed lag, back onto the trail. As an example, <trail id="scenic_trail" from="vista1" to="vista2" path="1 0 3 0 2.3 0 4.1 1.1 4 0 5.3 3 5.1 0 7 4.5" lag="3.4 1.2" guidance="teleport"/>. Here the trail "scenic_trail" describes navigation from "vista1" to "vista2" along the path points (1 0 3) (2.3 0 4.1) (4 0 5.3) (5.1 0 7) at times 0, 1.1, 3 and 4.5 seconds respectively. The allowed lag distance between the present user position and its closest point on the trail is 3.4 meters, and the allowed lag time between the present and prescribed time for the closest point on the trail is 1.2 seconds. In the event the user exceeds the allowed lag, the guidance attribute instructs the application to teleport the users from their current location to the closest space-time point on the trail path.

Zones are used to define demarcate regions in a space for a variety of uses. Zones can be volumes defined by simple enclosing shapes like a sphere, cube, cylinder arbitrarily transformed by an Affine transform such as a translate, rotate or scale, but can also be represented by an arbitrary closed 3D object. While these examples define enclosed regions of finite volume, Zones can also have infinite extent when defined for example as a cylinder of finite radius but infinite height, or conversely finite height but infinite radius. Another useful example of a zone of infinite extent is a planar 2D polygon extruded infinitely in a fixed direction outside the plane of the polygon. Zones are used most often to define regions of interest or disinterest in a space. Zones thus support a variety attributes that capture how users and objects might interact with zone. Example attributes include <zone js_id="0" onentry="test_enter( );" onexit="test_exit( );" scale="10 10 10"/>

The various markup tags and attributes may typically describe and link VR experiences in a declarative fashion. To add dynamics based on temporal events and other interaction between users and the VR experiences, an internet scripting language such as JavaScript may be used. As an extension of conventional internet web content, the VR experience can be accessed from the root "document" object of the DOM (Document Object Model) for the web page along with any other 2D DOM constructs defined in the web pages. The VR experience is accessed as document.experience. Similarly all tags and attributes can be defined and accessed. For example one might set gravity in a space to be document.experience.space.gravity=9.8; or the position in x of an object with id "myobj" in an experience using a statement like, document.experience.space.objects["myobj"].tx=5.0;

A number of approaches are provided to give access to dynamically create and destroy objects in an experience, such as document.experience.space.createObject(element, {attributes}); where the element is one of the tags defined within a space such as image, sound, or object, for which its attributes can also be optionally specified. For example createObject("object",{text: "Testing", pos: Vector(1, 0, 0)}); Objects can also be removed for example as document.experience.space.removeObject(id);

A number of approaches further provide access to dynamic events in a space such as document.experience.space.onLoad(); which is invoked when a user first enters the space. Other examples include:

document.experience.space.update([dt])—Invoked on each frame before the space is drawn. dt, an optional parameter, is the amount of time that elapsed between this update and the previous update, useful for ensuring objects move at the same speed regardless of framerate.

document.experience.space.onCollision(object, other)—Invoked twice when two objects in the space collide with each other: once with the first object as the first argument and the second object as the second argument, and once with the second object as the first argument and the first object as the second argument.

document.experience.space.onMouseUp( )—Invoked when the user releases the left mouse button. onMouseDown(), onMouseMove(), and onMouseDrag( ) are similarly defined.

Support is also provided via scripting to author site translators. Site translators are scripts users can write that tell Janus how to interpret an existing 2D website as a 3D space. A translated site is an experience that provides a re-interpretation of a legacy webpage authored using HTML. For example, a site translator can re-interpret the content at a video hosting site such as a "youtube.com" so it is dynamically presented as videos playing on the virtual screen of a 3D movie theater.

The title of a site translator script describes which domain url is being translated into a VR experience. For instance, a translator script titled "youtube.com.js" translates the 2D website "www.youtube.com". The translator will apply to all web pages within that domain. The URL of the current 2D web page is accessible through the variable window.experience.url. The translator script can work by defining a createExperience function:

window.experience.createExperience=function( ){//experience creation code goes here}; This function will be called as soon as the DOM of the 2D web page is loaded.

In most cases, you will want to iterate over some DOM elements, and map each of them to something in the 3D environment. The source for the 2D webpage can be inspected in an existing web browser to find the DOM elements of interest for translating.

The getElementsByClassName is used to access DOM elements. The following snippet provides an example of finding all posts on a blog and extracting the title and the body:

```
var posts = document.getElementsByClassName("post_content");
for (var i = 0; i < tumblr_posts.length; i++) {
```

```
var post_title = tumblr_posts[i].getElementsByClassName("post_title")[0];
var post_body = tumblr_posts[i].getElementsByClassName("post_body")[0];
// Create objects to correspond to post title and body.
```

Objects are created similar to as before for example as, window.experience.createasset("object", {id:"Cube", src: translator_path+"Cube.fbx"}); which loads a 3D model from an FBX file. The translator_path variable points to the location of all asset files. You can then add the 3D model to the room using the following syntax window.experience.createobject("object", {id:"Cube", js_id:"Cube0", lighting: "true", collision_id:"Cube", pos:"0 0 0", scale:"20 0.1 20", fwd:"1 0 0"}); Dynamics and user interaction is added to the site analogously using functions such as onclick and oncollision attributes. For example: window.experience.createobject("object", {id:"Cube", js_id:"Cube0", onclick:"cubeClick( )"}); sets the onclick function to cubeClick( ). The cubeClick( ) function can then be defined in a script file for the translator using window.experience.createasset("script", {src:"[path_to_script]"});

As an example, a user may re-interpret webpages with image and video content as a room resembling an art gallery and place 2D elements along walls of the room for hosting the image or video content. As a specific example, a user can link various videos from well-known video hosting websites (for example, Youtube™ or Vimeo™) and/or image hosting websites (for example, Facebook™, Instragram™, Shutterstock™, or the like) and represent them as artifacts on virtual art gallery walls.

Although the foregoing has been described with reference to certain specific embodiments, various modifications thereto will be apparent to those skilled in the art without departing from the spirit and scope of the invention as outlined in the appended claims.

The invention claimed is:

1. A computer implemented method of linking a first virtual reality (VR) immersive space with a second VR immersive space, the method comprising:
   generating a portal in the first VR immersive space, the generating of the portal comprising defining position vectors for the portal in the first VR immersive space, the first VR immersive space having a first website displayed on a surface of the first VR immersive space;
   associating an internet link to the second VR immersive space with the portal, the internet link being part of the first website to link to a second website;
   rendering the second VR immersive space, the second VR immersive space having the second website displayed on a surface of the second VR immersive space;
   providing a preview of the second VR immersive space on a display surface of the portal located in the first VR immersive space; and
   virtually placing a user in the second VR immersive space when the portal is selected by the user.

2. The method of claim 1, wherein selection by the user comprises having the user virtually walk through the portal.

3. The method of claim 1, wherein a GL Shading Language defines the appearance of the portal.

4. The method of claim 1, wherein generating the portal further comprises defining direction vectors for the portal in the first VR immersive space.

5. The method of claim 1, wherein generating the portal comprises defining a linking position in the second VR immersive space for the portal, and wherein virtually placing the user in the second VR immersive space comprises virtually placing the user at the linking position.

6. The method of claim 1, wherein the portal is generated only when the user selects the internet link in the first VR immersive space.

7. The method of claim 1, wherein providing the preview of the second VR immersive space comprises displaying at least a portion of the second website on at least portion of the surface of the portal.

8. The method of claim 1, wherein the portal is a two-dimensional object and the display surface is a surface of the two-dimensional object.

9. The method of claim 8, wherein the two-dimensional object is in the shape of a square, oval, or circle.

10. The method of claim 1, wherein the portal is a three-dimensional object and the display surface is at least one of the surfaces on the three-dimensional object.

11. The method of claim 1, wherein the display surface has two or more hotspots each associated with separate respective regions of the display surface, and when selected, each hotspot associated with virtually placing the user in the second VR immersive space at a different virtual location in the second VR immersive space.

12. The method of claim 1, wherein selection of the portal by the user comprises the user touching the portal.

13. The method of claim 1, wherein selection of the portal by the user comprises the user performing a predetermined hand gesture.

14. The method of claim 1, after virtually placing the user in the second VR immersive space, the method further comprising:
   generating a return portal in the second VR immersive space;
   providing a preview of the first VR immersive space on a display surface of the return portal located in the second VR immersive space; and
   virtually placing the user in the first VR immersive space when the return portal is selected by the user.

15. A system for linking a first virtual reality (VR) immersive space with a second VR immersive space, the system comprising:
   a database storing data associated with the first VR immersive space and the second VR immersive space; and
   a processing unit in communication with the database, the processing unit executable to perform:
      generating a portal in the first VR immersive space, the generating of the portal comprising defining position vectors for the portal in the first VR immersive space, the first VR immersive space having a first website displayed on a surface of the first VR immersive space;
      associating an internet link to the second VR immersive space with the portal, the internet link being part of the first website to link to a second website;
      rendering the second VR immersive space, the second VR immersive space having the second website displayed on a surface of the second VR immersive space;
      providing a preview of the second VR immersive space on a surface of the portal located in the first VR immersive space; and
      virtually placing a user in the second VR immersive space when the portal is selected by the user.

16. The system of claim 15, wherein selection by the user comprises having the user virtually walk through the portal.

17. The system of claim 15, wherein a GL Shading Language defines the appearance of the portal.

18. The system of claim 15, wherein generating the portal further comprises defining direction vectors for the portal in the first VR immersive space.

19. The system of claim 15, wherein generating the portal comprises defining a linking position in the second VR immersive space for the portal, and wherein virtually placing the user in the second VR immersive space comprises virtually placing the user at the linking position.

20. The system of claim 15, wherein the portal is generated only when the user selects the internet link in the first VR immersive space.

21. The system of claim 15, wherein providing the preview of the second VR immersive space comprises displaying at least a portion of the second website on at least portion of the surface of the portal.

22. The system of claim 15, wherein the database is located on a webserver.

23. The system of claim 15, wherein the portal is a two-dimensional object and the display surface is a surface of the two-dimensional object.

24. The system of claim 23, wherein the two-dimensional object is in the shape of a square, oval, or circle.

25. The system of claim 15, wherein the portal is a three-dimensional object and the display surface is at least one of the surfaces on the three-dimensional object.

26. The system of claim 15, wherein the display surface has two or more hotspots each associated with separate respective regions of the display surface, and when selected, each hotspot associated with virtually placing the user in the second VR immersive space at a different virtual location in the second VR immersive space.

27. The system of claim 15, wherein selection of the portal by the user comprises the user touching the portal.

28. The system of claim 15, wherein selection of the portal by the user comprises the user performing a predetermined hand gesture.

29. The system of claim 15, after virtually placing the user in the second VR immersive space, the processing unit further executable to perform:
   generating a return portal in the second VR immersive space;
   providing a preview of the first VR immersive space on a display surface of the return portal located in the second VR immersive space; and
   virtually placing the user in the first VR immersive space when the return portal is selected by the user.

* * * * *